United States Patent [19]
Allen et al.

[11] Patent Number: 4,757,533
[45] Date of Patent: Jul. 12, 1988

[54] SECURITY SYSTEM FOR MICROCOMPUTERS

[75] Inventors: Michael J. Allen, St. Charles; John Langlois, Cary, both of Ill.

[73] Assignee: Computer Security Corporation, Chicago, Ill.

[21] Appl. No.: 774,821

[22] Filed: Sep. 11, 1985

[51] Int. Cl.⁴ .............................................. H04L 9/00
[52] U.S. Cl. ........................................ 380/25; 380/23
[58] Field of Search ............... 178/22.08, 22.09; 364/200, 900; 380/23-25; 340/825.34; 235/379-382, 492

[56] References Cited

U.S. PATENT DOCUMENTS

| | | | |
|---|---|---|---|
| Re. 27,251 | 12/1971 | Amdahl et al. | 364/200 |
| 3,368,207 | 2/1968 | Beausoleil et al. | 364/200 |
| 3,566,362 | 2/1971 | Taylor | 364/200 |
| 3,573,855 | 4/1971 | Cragon et al. | 364/200 |
| 3,771,146 | 11/1973 | Cotton et al. | 364/200 |
| 3,828,327 | 8/1974 | Berglund et al. | 364/200 |
| 3,931,504 | 1/1976 | Jacoby | 364/200 |
| 4,040,034 | 8/1977 | Belady et al. | 364/200 |
| 4,078,152 | 3/1978 | Tuckerman | 178/22 |
| 4,095,738 | 6/1978 | Masuo | 235/309 |
| 4,095,739 | 6/1978 | Fox et al. | 235/382 |
| 4,121,523 | 10/1978 | Hastings | 109/2 |
| 4,177,510 | 12/1979 | Appell et al. | 364/200 |
| 4,246,638 | 6/1981 | Thomas | 364/200 |
| 4,255,786 | 3/1981 | Holtey et al. | 364/200 |
| 4,262,329 | 4/1981 | Bright et al. | 364/200 |
| 4,319,079 | 3/1982 | Best | 178/22.09 |
| 4,386,233 | 5/1983 | Smid et al. | 178/22.08 |
| 4,395,628 | 7/1983 | Silverman et al. | 235/382 |
| 4,464,566 | 8/1984 | Silverman et al. | 235/382 |
| 4,519,032 | 5/1985 | Mendell | 364/200 |
| 4,558,176 | 12/1985 | Arnold et al. | 178/22.08 |
| 4,609,996 | 9/1986 | Kummer | 364/900 |
| 4,644,493 | 2/1987 | Chandra et al. | 380/22 |
| 4,652,990 | 3/1987 | Pailen et al. | 364/200 |
| 4,654,821 | 3/1987 | Lapp | 364/900 |
| 4,658,093 | 4/1987 | Hellman | 380/25 |
| 4,672,182 | 6/1987 | Hirokawa | 235/492 |

OTHER PUBLICATIONS

IBM Technical Disclosure Bulletin, vol. 21, #2, Jul. 1978, "Preventing Unauthorized Access to Diskette-Loaded Microcode", by A. Gurugé.

Primary Examiner—Salvatore Cangialosi
Assistant Examiner—Aaron J. Lewis
Attorney, Agent, or Firm—Milton S. Gerstein; Marvin N. Benn

[57] ABSTRACT

A security system for a personal computer, in which hardware and software are combined to provide a tamper-proof manner of protecting user-access and file-access. The hardware component of the system is an expansion board for insertion into an expansion slot of the PC, and has a first EPROM chip containing four portions of machine code for initializing system function calls and for establishing the proper boot-processing of the PC; a second RAM chip serving as scratch pad memory; a third EEPROM chip storing passwords, audit trail log, protection and encryption system flags, and user-access rights; a fourth automatic encryption and decryption chip for files of the PC; and a fifth clock chip for the audit trail. The software component includes a batch file that runs a program in conjunction with the machine code on the EPROM of the expansion board ensuring access is gained only for valid users. The code on the EPROM monitors all DOS 21H file handling function calls, and initializes the 7CH interrupt vector for allowing the security system to access DOS and the files thereof. During boot processing, the 10H video interrupt handler is monitored to prevent circumventing the security system. Hard-disc format-protection is also provided by monitoring of the 13H interrupt function calls. Files may also be created that may not be copied.

33 Claims, 18 Drawing Sheets

| DOS FUNCTION CALL No. | FUNCTION NAME | FLOW CHART REFERENCE | |
|---|---|---|---|
| 0F | OPEN FILE (FCB TYPE) | 2 | |
| 10 | CLOSE FILE (FCB) | 3 | |
| 13 | DELETE FILE (FCB) | 6 | |
| 14 | SEQUENTIAL READ (FCB) | 4 | |
| 15 | SEQUENTIAL WRITE (FCB) | 5 | |
| 16 | CREATE FILE (FCB) | 1 | DOS 1.00 FUNCTION CALLS |
| 17 | RENAME FILE (FCB) | 6 | |
| 21 | RANDOM READ (FCB) | 4 | |
| 22 | RANDOM WRITE (FCB) | 5 | |
| 27 | RANDOM BLOCK READ (FCB) | 4 | |
| 28 | RANDOM BLOCK WRITE (FCB) | 5 | |
| 3C | CREATE FILE (FILE HANDLE) | 1 | |
| 3D | OPEN FILE (FILE HANDLE) | 2 | |
| 3E | CLOSE FILE (FILE HANDLE) | 1 | |
| 3F | READ FROM FILE/DEVICE (FILE HANDLE) | 4 | DOS 2.00 FUNCTION CALLS |
| 40 | WRITE TO FILE OR DEVICE | 5 | |
| 41 | DELETE FILE (FILE HANDLE) | 6 | |
| 43 | CHANGE FILE MODE | 6 | |
| 4B | LOAD/EXECUTE A PROGRAM (EXEC) | 7 | |
| 56 | RENAME A FILE | 6 | |
| 5A | CREATE TEMPORARY FILE | 1 | DOS 3.00 FUNCTION CALLS |
| 5B | CREATE NEW FILE | 1 | |

| USER NUMBER: | 1 | 2 | 3 | 4 | 5 | 6 | 7 | 8 | 18 | 19 | 20 |
|---|---|---|---|---|---|---|---|---|---|---|---|
| DEPARTMENTS | | | | | | | | | | | |
| 1 CORPORATE | W | | WL | | | | W | R | R | | W |
| 2 SALES | | | | | | | | | W | | W |
| 3 ACCOUNTS | | | | | | | | | W | | |
| 4 PERSONNEL | | | | | | | | | | | W |
| 5 PAYROLL | | | R | | | WL | | | | | |
| 6 BUDGETS | | | | | | | | | RL | | W |
| 7 ACCOUNTING | | | | | | W | | | | | |
| 8 WORD PROCESSING | W | | W | WL | | W | | | W | W | W |
| FILE GROUPS | | | | | | | | | | | |
| 1 FILE GROUP 1 | W | | | | | | | | | | |
| 2 FILE GROUP 2 | | W | | | | | | | | | |
| 3 SPREAD SHEET 1 | | | N | | | | | | N | | |
| 4 SPREAD SHEET 2 | | | R | | | | | | N | | |
| 5 SPREAD SHEET 3 | | | | | | | | | R | | |
| 6 SCHEDULES | | | | | | | | | | | |
| 7 LETTERS 1 | | | | | | | | | | | |
| 8 LETTERS 2 | N | | | | | | | | | | |
| 9 LETTERS 3 | R | | | | | | R | 'R | RL | | |
| 10 MEMOS 1 | | | | | | | | | | | |
| 62 EASTERN DATA | | | N | | | | | | N | | |
| 63 MIDWEST DATA | | | W | | | | | | N | | |
| 64 WESTERN DATA | | | N | | RL | | WL | | N | | |

50

SECURITY SYSTEM FOR MICROCOMPUTERS

BACKGROUND OF THE INVENTION

The present invention is directed to a security system for personal computers, often called microcomputers, and has specific application to the IBM line of personal microcomputers.

Microcomputers have grown in use and in number over the last decade, and are currently used by individuals, small business, medium-sized businesses, and large businesses. The use of these microcomputers runs the gamut from word processing to bookkeeping to engineering and scientific applications. Due to the ever-growing sophistication and possible applications of microcomputers, the number of them that can be expected to be in use ten years hence may quadruple that currently in use.

The microcomputer industry has not only grown by leaps and bounds, but has experienced intense competition among its many manufacturers. Standardization among the many different kinds of microcomputers is still in its early stages, but it is expected that such will ever-advance.

In the light of this intense competition, overall market growth, and the potential for such growth in the years to come, special security measures have only recently become a necessity in order to protect files from unwanted user access, and to protect access in general for only those users given such rights. Further, a security system that is practicable, useful, and safe also must be readily adaptable to all special uses and applications of microcomputers.

There are currently available microcomputer security systems that protect, in one way or another, the P.C. from unauthorized use, but these generally suffer from many disadvantages, such as lack of adequate range of security provided, lack of enough flexibility, are software-only systems that a capable programmer may easily circumvent, and lack of central control. Most prior-art security systems are simple password-type systems that simply allow or prevent access to the file or files based on the password entered, which is compared with a list of valid passwords stored in memory.

SUMMARY OF THE INVENTION

It is, therefore, the primary objective of the present invention to provide a personal comnputer security system that prevents access to the operating system of the personal computer by invalid users, and also protects against access to selected files of the computer on a user-by-user basis.

It is, also, another objective of the present invention to provide such protection by using a combination of hardware and software, with each contributing vitally to the security of the system, so that each prevents the unlawful access to the computer and files thereof.

It is yet another objective of the present invention to provide a security system for personal computers that allows for the protection of a file by degree, such that one user may have no access to that file, while another may have only read-access to that file, while still another may have both read and write-access to that file.

It is still another objective of the present invention to provide a security system for a personal computer that also selectively encrypts files by a chosen method of encryption.

It is another objective of the present invention to allow for the hardware portion of the invention to be installed such that during the bootprocessing of the system, the video-handling interrupt functon calls are monitored to prevent circumvention around the system of the present invention.

It is still an additional objective of the present invention to allow a central security administrator to make all of the choices regarding which users have access rights to the personal computer's operating system, which users have which rights to the files to be protected, and what rights each user has in deciding for himself the degree of protection and/or encryption of the files.

It is an objective of the present invention to also prevent the unwanted and unlawful formatting of the hard disc of the personal computer, as well as prevent the copying of files that the central security administrator wants to make incapable of being copied.

It is also an objective of the present invention to allow for the continual updating and changing of the security parameters on a user-by-user basis and on a file-by-file basis, so that new users may be added to the list of valid users, and also allow for the changing over of files from the status of protected and/or encrypted to not-protected and/or encrypted, and vice-versa.

Toward these and other ends, the security syustem of the present invention includes as its hardware portion an expansion board insertable into one of the expansion slots of the personal computer. The expansion board includes an EPROM on which is stored object code. There are four portions to the EPROM: the first portion contains code for boot-process handling; the second portion contains code for the main file handling interrupt function calls of the operating system; the third portion contains code for the available interrupt function calls of the present invention; and the fourth portion contains object code for the monitoring of the hard disc format interrupt vector.

The expansion board of the present invention also includes a ram chip, serving as a scratch pad, and an erasable nonvolatile memory, such as EEPROM, on which are stored the passwords of the valid users of the personal computer, the "Resource Allocation Table", which lists the files by groups and departments and which includes the system flags for setting the status of protection of each file-group and department, as well as their status with respect to each valid user. The table also includes logging information relating to an audit trail of all accesses to the operating system and protected files, of each file group with regard to encryption. The information contained in the Resource Allocation Table is accessible by the software portion of the invention via the available interrupt, the code for which is contained on the third portion of the EPROM.

The expansion board of the present invention also includes an encryption chip, the standard DES chip. This chip is initialized upon the installation of the expansion board in the expansion slot of the computer. The encryption chip is coupled to the computer system's clock by a flip-flop to divide down the frequency thereof to a workable one. Thus, when the Central Security Administrator chooses encryption for a file or for all of the files, they are automatically encrypted when written to, and automatically decrypted when read. Further, the Administrator has the option of encrypting in one method and decrypting in another so that when the file is transmitted to another computer, It cannot be read until the proper encryption methods are used.

The expansion board also includes a real-time clock chip with associated crystal for keeping an audit trail of all accesses to the computer and to the protected files. The audit trail is recorded directly onto the EEPROM. The EEPROM may also be provided with object code for its Resource Allocation Table indicating which user and/or file is to be logged by the audit trail.

The sofware portion of the security system for personal computers of the present invention includes a number of utility programs for setting the correct user and file status and system flags, as well as an AUTOEXEC.BAT file that locks the security system of the present invention with its hardware into the operating system of the computer. The first program run in this batch file, the program called SETGUARD, checks not only for a valid user password to allow or deny access to the operating system, but also checks for the existence of the board itself. This program also engages the code on the EPROM ff or hooking in the operating system's input/output calls of the file handling interrupt of the operating system.

The security system of the present invention is intended for express use with the IBM PC or IBM-compatible PC's, though its uniqueness has relevance to any PC. In the IBM PC, the system of the present invention monitors the 21H interrupt, while the security system's function calls are made through the available 7CH interrupt. Further, during boot-processing, the interrupt 10H (Video Handler Interrupt) is monitored. For hard-disc-formatting protection, the system of the invention monitors the 13H interrupt.

BRIEF DESCRIPTION OF THE DRAWING

The invention will be more readily understood with reference to the accompanying drawing, wherein

FIG. 3 is a chart depicting the DOS 21H function calls that the security system of the present invention monitors in an IBM PC or IBM-compatible PC;

FIG. 4 is a representation of the resource allocation table of the security system of the present invention, where the files are arranged by file-groups and departments, with the columns of the representation showing the users, and the rows the file-group and/or department of file-groups, with insertions into the squares of the table indicating the type of access rights to the file-group and/or department for each user;

DETAILED DESCRIPTION OF THE INVENTION

The security system of the present invention, hereinafter called "Sentinel" for brevity's sake, is designed specifically for protecting IBM-PC and IBM-compatible microcomputers. In essence, the "Sentinel" security system of the present invention safeguards files: By allowing or preventing access to a file group or department of file groups by a user, with such access and prevention being utilized either for reading a file or group of files, for writing a file or group of files, or for both reading and writing a file or group of files, which in the present application is generally termed the "protection" of file groups: by encrypting a file or files either by the well-known DES encryption method, or another encryption method, generally termed in the present application "encryption" of a file, which includes a changeable key that may be altered by a central security administrator, so that only another microcomputer with the same key may decrypt the file or group of files previously encrypted with the same key; and by preventing access to DOS(disc operating system) of the microcomoputer if a valid password has not been entered, or an expired password has been entered.

The manner by which the system of the present invention provides control is centered around the person called a "Central Security Administrator" (CSA). He is the individual to whom is given the task of controlling access to the computer and its files by user-basis, file-basis, and department-basis. The Central Security Administrator determines which of those employees, or the like, is to have access in general, to the computer, and also determines which of the file groups and/or departments each user may read and/or write, as well as determining which or all of the files that are to be encrypted.

Figure 1:
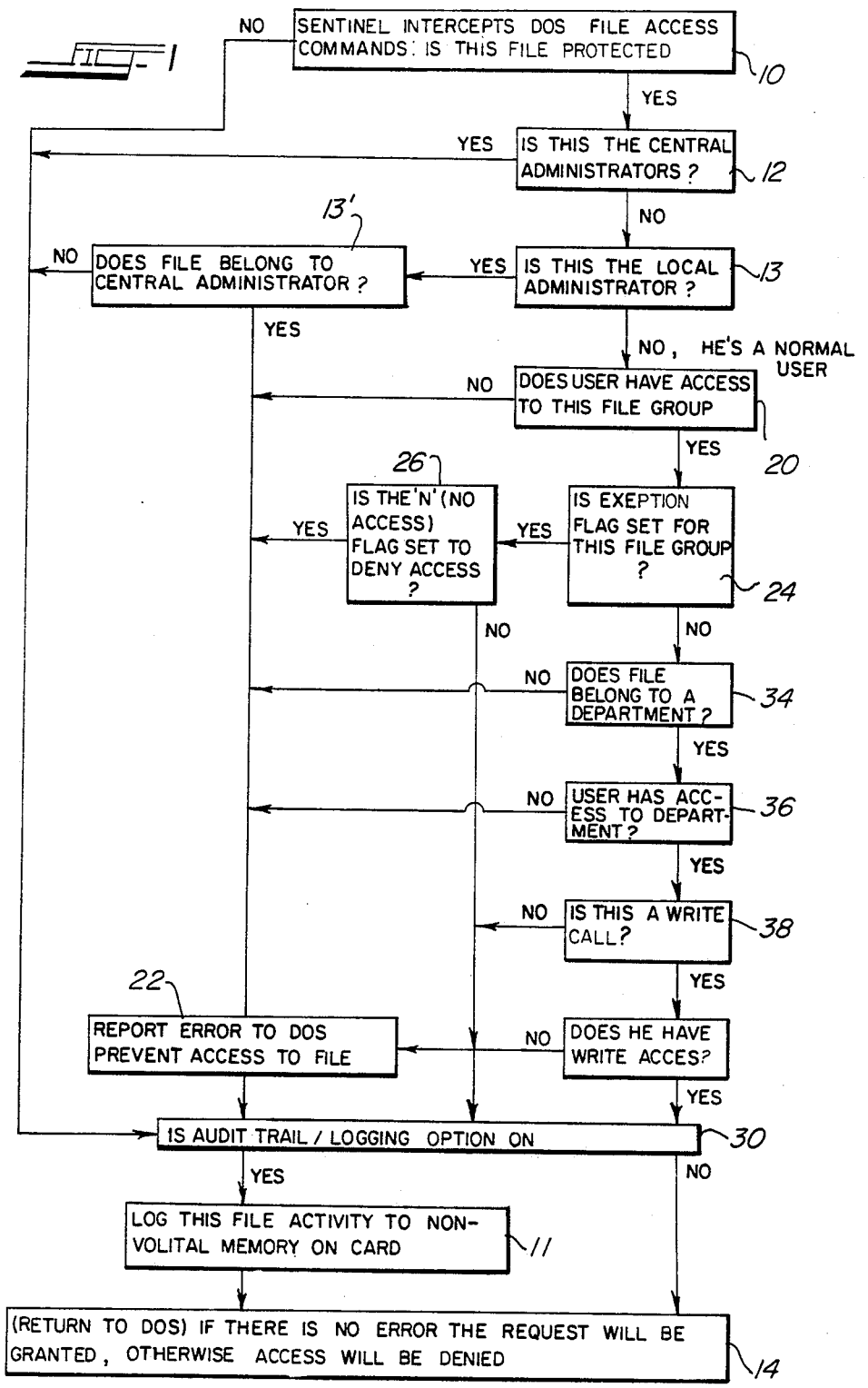
FIG. 1 is a a flow diagram showing the steps the security system of the present takes to ensure each file is accessed only by a user having some kind of right thereto.

FIG. 1 is a control flow chart showing generally the functions available to the Central Security Administrator, as well as the flow of events for the general safeguard of files stored in memory. Assuming that the "Sentinel" security system of the present invention has already been installed in the microcomputer in a manner to be described below, all accesses to DOS files are first routed to "Sentinel" for examination to determine that the user is a valid one, and that the file is accessible to that particular user. For all file access commands, which are achieved in DOS by the 21H interrupt vector, Sentinel intercepts such commands, as indicated by block 10 in FIG. 1. It is then determined if the file which is to be accessed is protected or not. If the file is not protected, then Sentinel will either log the data and time of the attempt (Block 11) if the logging option is used, and then return to DOS, or will just return to DOS if there is no logging option used. If the file to be accessed is, in fact, a protected file, then Sentinel checks to see if the user is the Central Security Administrator or not (Block 12). If this is the Central Security Administrator, then return to DOS follows. If the user is not the Central Security Administrator, then Sentinel sees if it is a local administrator. If this is a local administrator, having broader control powers than a normal user, Sentinel will check to see if the file belongs only to the Central Security Administrator, or not. If it does belong to the Central Administrator(Block 13'), then the system will report an error message to DOS, which will deny access to that file, as indicated in block 14. If the file does not belong to the Central Security Administrator, but is one that the local administrator may gain access to, then no error message is sent to DOS, but simple return to DOS is carried out. If the user is not the local administrator, but a normal user having no overall broad control over the protection of file groups and departments, then Sentinel will check to see if this user has access rights to the file being accessed, regardless of the status of the Protection Flags, as shown in block 20. If he does not, then an error message is reported to DOS, and access is denied, as indicated in block 22. If he does have access rights, then Sentinel checks to see if this user has both read and write priveleges. This is shown in Blocks 24 and 26, where block 24 checks to see if there is an exception flag that either totally denies access to that file group or allows only reading of the file group. If there has been placed an exception flag for this file group, meaning that the local or central administrator has at least temporarily closed off write and/or read-access to this file group for the user, then Sentinel will check to see if such denial is due to the fact that the user has been denied total access(block 26). If no access at all has been set for the user, an error message(block 22) will be sent to DOS, as well as the logging thereof(block 30). If there is no exception flag, then Sentinel will check to see if the file group belongs to a department containing therein the file group. If it is "no" (block 34), an error message will be sent to DOS, since only files belonging to departments are allowed access, those not belonging to a department being special files that a particular user himself may create for his own use without access thereto by any other user. If the file does belong to a department, then Sentinel will check to see if the user has access to the overall department in which the file group is included (block 36). If he does not have access to the department, then an error message will be sent to DOS, and he will be denied access. If he does have access to the department, then Sentinel will determine if the access is a write call or a read call(block 38). If it is a read call, then Sentinel exits to DOS, and access is allowed. If it is a write call, write-access is checked for the user, and if he has such write-access, Sentinel returns to DOS and writing is allowed. If he does not have write-access, Sentinel reports an error to DOS, and access is denied.

Figure 2:
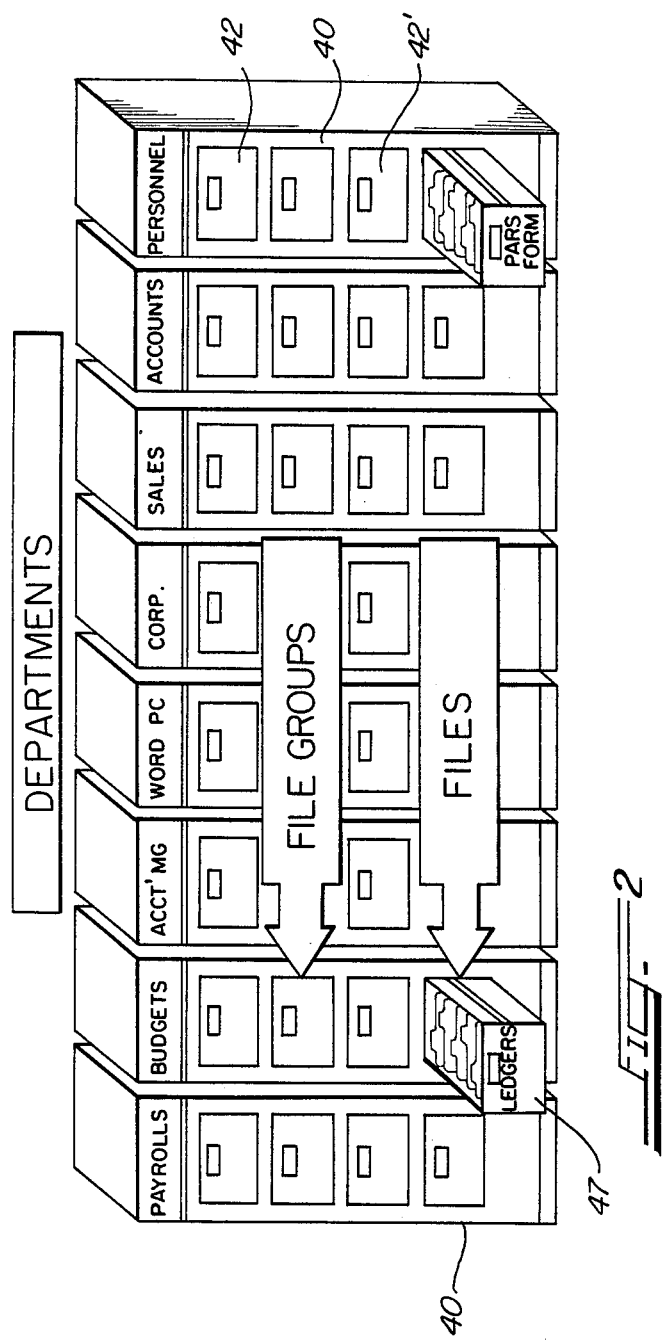
FIG. 2 is a representation of the manner by which the files of the personal computer protected by the security system of the present invention are arranged into file groups and departments for providing a logical and flexible way of allowing protection thereof.

In order to understand the grouping by which the security system of the present invention arranges the files of memory, FIG. 2 is referred to which compares the Sentinel-file arrangement to a series of cabinets 40 each containing therein a series of file groups 42. Sentinel, in the preferred embodiment, arranges file groups into a total of eight departments, such as "word processing", "budgets", "sales", and the like, as shown in FIG. 2. Each department, in turn, includes a number of file-groups, the total number of such file groups equalling sixty-four in the preferred embodiment. Each file-group itself includes a number of separate files, as indicated by open file drawer 27 in FIG. 2. The Central Security Administrator may at his choosing deny access to any one of the sixty-four file groups to any user, as well as denying access to any department. Thus, if the Central Security Administrator wanted to deny access to the department labelled "Payroll", in so doing all file groups, and, therefore, all files therein, are denied access to the user or users so desired. The manner by which the Central Administrator carries this out shall be explained below. Thus, Sentinel provides a two-tier system, whereby protection may be achieved either by individual file-groups, or by department, it being understood that if a whole department is denied access rights to a user, each file-group therein is automatically closed off,too, to that user. Which file-groups are placed under which department are at the Central Security Administrator's discretion, and it is possible to include the same file-group in more than one department. The exact type of safeguarding that the Central Security Administrator may choose for each file-group and/or department includes preventing total read and write access to the file-group and/or department, read-only access thereto without writing thereto, and, if access is allowed for a certain user, the encryption of the file in the file-group. To summarize, the Central Security Administrator may prevent access by any user of the P.C. to the files by: Preventing total read and write access to a whole department, or to any one file or files of that department, or may also prevent only write-access thereto while still allowing read-access, and, at the same time, encrypt each file whether or not a user has access to that file or not.

In order to ensure that each file that is created by a user of the P.C. is inserted into a file-group, the Central Security Administrator chooses for each user a default file-group, such a file-group 42' in FIG. 2, for, for example, user number one. Thus, whenever a user creates a file, that file is automatically placed in the default file-group 42'. However, if the user himself has not chosen a default file-group, by the SETFILE program discussed below, the new file will automatically be stored in the first file-group to which that user has write-access privilege. Also, if the Central Security Administrator(-CSA) has allowed a specific user the right to choose whether or not his file or files are to be protected or not, which the Central Administrator accomplishesh by the ADMIN program discussed below, a normal user may decide himself if the file he is creating, or has already created, is to be protected or not, by using the TOGGLE program available to every normal user. This TOGGLE program allows a normal user to either protect or not-protect, as well as allow him to use the ESTATUS program to encrypt or not-encrypt, if the Central Administrator has allowed the normal user such privelege. However, the CSA also has the choice of automatically protecting and encoding each and every file for every user by the OPTIONS program, so that every file that is created is automatically encryped and/or protected, without the normal user having any power at all to alter such condition.

Before continuing with the description of the controls afforded both the CSA and normal users over the files of the P.C., it is firstly noted that security system of the present invention utilizes a novel combination of hardware and software, which combination not only provides hitherto unknown degree of safety and protection, and safeguarding of the files of the P.C. but also allows for unprecedented flexibility. The complete description of the hardware components of the invention shall be set out below in greater detail, but for now, in order to get a better understanding of unification of both hardware and software into one coherent sytem, it is noted that all memory management, file management, and I/O(input/output) calls are made in DOS through the 21H(hexadecimal) interrupt vector. There are a total of ninety-eight function call types under the 21H interrupt, with the system of the present invention monitoring and controlling twenty-two of these function calls, each of which has importance with files, file-management, and the like. FIG. 3 lists these twenty-two function calls monitored by Sentinel. Such is accomplished by the appropriate machine code formed in a first portion of an EPROM, one of the five chips used in the card of the present invention, which card is inserted into one of the expansion slots (except the J8 slot) of an IBM-PC, such being carried out at first installation of the card of the system of the present invention. It will be noted that these twenty-two function calls monitored by the system of the invention provide every access to the files of the microcomputer by which security may be compromised. As will also be explained in greater detail below, access to chip memory on the expansion board of the present invention is achieved through the 7CH interrupt vector of of the DOS operating system of the IBM-PC. The function calls, and the associated AH-register contents therefor, shall be explained below.

For the purposes of understanding the arrangement of the file groups and departments thereof, FIG. 4 shows a pictorial representation of just how the file-groups and departments would look on the EEPROM chip on the expansion board of the present invention, to be described below, such showing in FIG. 4 being called the "Resource Table Matrix". This graphic representation table 50 is divided into 20 columns, one column for each normal user whose access is to be controlled. There are 8 rows for the eight departments, and 64 rows for the 64 file-groups. This table, which may also termined the "Resource Allocation Table", is set up and controlled by the CSA. In the table, when a letter "W" is inserted in a chosen location, it means that that user has read and write access to the file-group and/or department thereof. An "R" allows him only read-access, but not write-access An "N" denies both write and read-access to the file group or department. An "L" indicates that all accesses to that file-group are logged by the logging software of the present invention to be described below. It may, therefore, be seen that the CSA may deny any type of access to a file-group or to a whole department by the simple insertion of the appropriate symbol therefor. Also, any file-group that has not been assigned to a department is automatically denied access to a user unless an appropriate access symbol has been indicated in the specific user's column for that file-group. In FIG. 4, at the department level, where there are no entires under a column, it means that access to that department is totally denied, the Resource Allocation Table limiting access to existing protected files regardless of the state of the Protection and Encryption Flags, which flags determine what happens to newly created files when they are added to the system. It may, then, be seen that tremendous flexibility is provided by the arrangement of the files by file-groups and departments according to the present invention.

Figure 5:
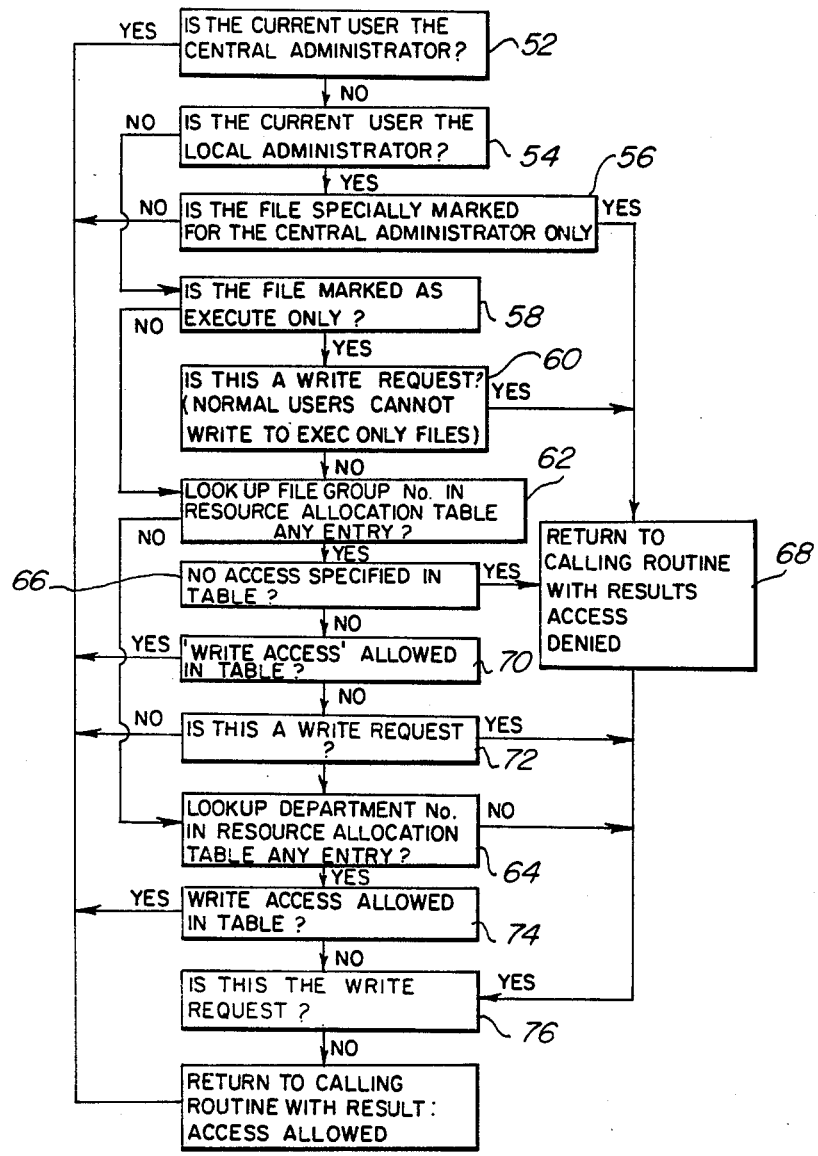
FIG. 5 is a flow chart similar to FIG. 1 showing the sequence of events performed by the security system of the present invention to deny access to invalid users or users not having access to a respective file, with the additional showing in this chart of the special file called "Execute Only" file which prevents the writing or copying thereof.
Figure 19:
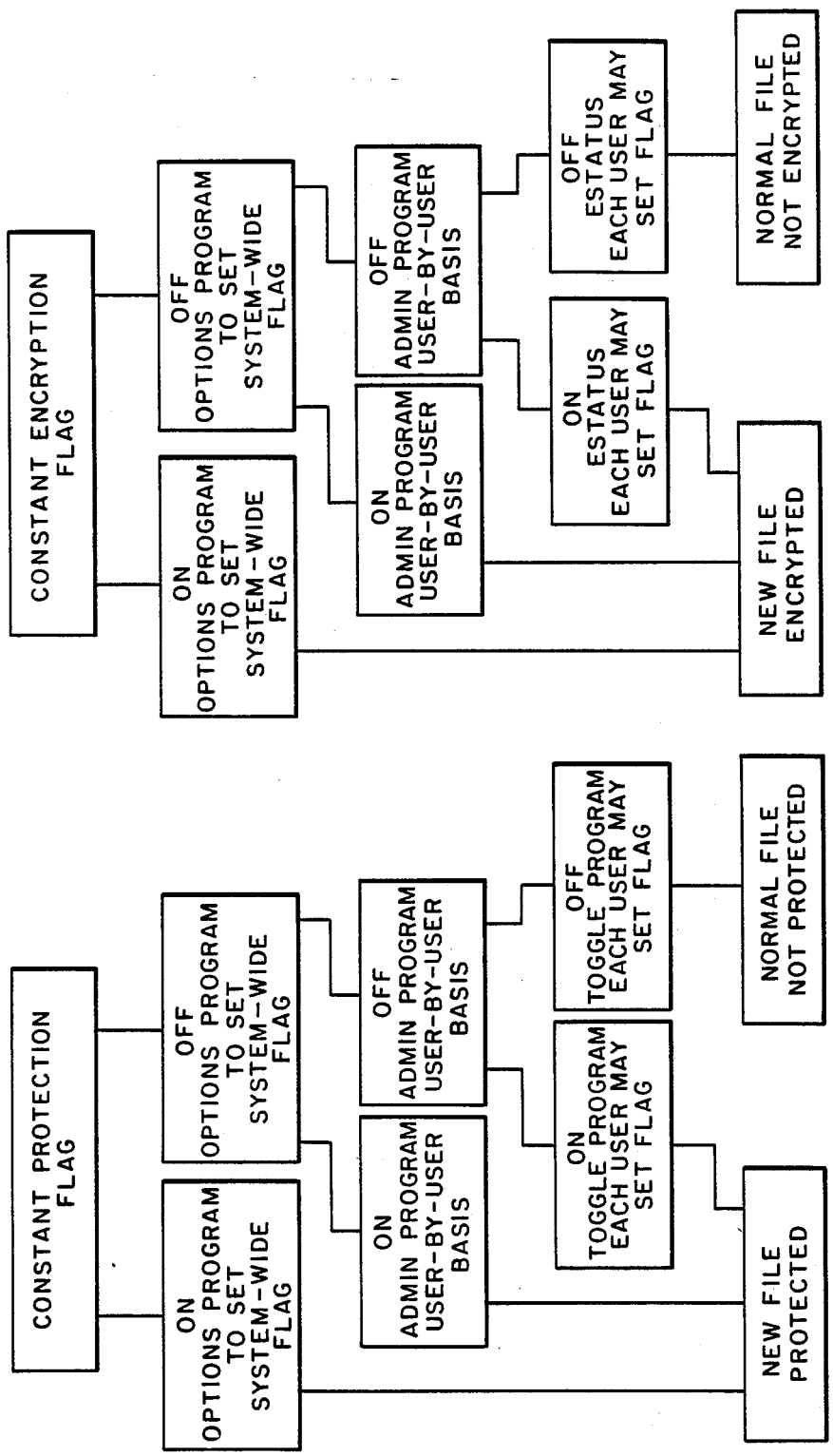
FIG. 19 is a decision tree for the Central Security Administrator showing the options available to him for providing constant, selected or no protection and/or encryption of newly created files and existing files.

In FIG. 5, there is shown a flow chart for checking a user's access rights to a given file, regardless of the state of the Protection and Encryption Flags for the case where the CSA has chosen constant protection, with the concomitant constant encryption thereof, of new files, and the constant protection of all existing files. The CSA may achieve constant protection and constant encryption by the OPTIONS program available to him, which automatically protects and encrypts all new files, or he can do so on a user-by-use basis using the ADMIN program. It is noted that if the CSA has not chosen such constant protection with or without constant encryption, each user having access rights may choose for himself whether or not such protection and/or encryption of newly created files will exist by the ESTATUS program for encryption, or the PROTECT program or TOGGLE program for protection. In FIG. 5, Sentinel checks to see if the user is the CSA, the local administrator, or a normal user, as shown in blocks 52,54, and 56. Block 58 checks to see if the file is an EXECUTE ONLY file, which comprises any executable program file, marked to deny normal reads and writes. Since normal users do not normally have write access to "execute only" files, if the user is a normal user, then access will be denied him to that file if the access is a write request, as shown in block 60. In block 62, the file-group attempted to be accessed is checked for in the Resource Allocation Table to see if the current user has any entry next to that file-group in his column. If there is no entry, then a check is made at the department level (block 64). If there is no entry, access will be denied the user. If there is an entry in the table for that user next to the file-group attempted to be accessed, then if such entry is a "no access" entry, return to DOS ensues with an error message (block 66 and block 68). If some access is allowed, write-access is checked for, as shown in Block 70, which is compared against the access attempted, as shown in blocks 72 and 74. Block 76 checks for write-access for the department level. It is again noted that, there may be access allowed at the department level, but a file-group therein may be denied access separately by the insertion of an "N" in the appropriate column of the user and row of the file-group in the Resource Allocation Table. FIG. 19 shows a decision tree for the Central Security Administrator listing the options available to him for constant protection and/or constant encryption by the OPTIONS program, which automatically protects and/or encrypts all newly created files for every user, and the files to be automatically protected and/or automatically encrypted on a user-by-user basis using the ADMIN program, and the power left to a normal user by the TOGGLE program and PROTECT program.

Figure 6:
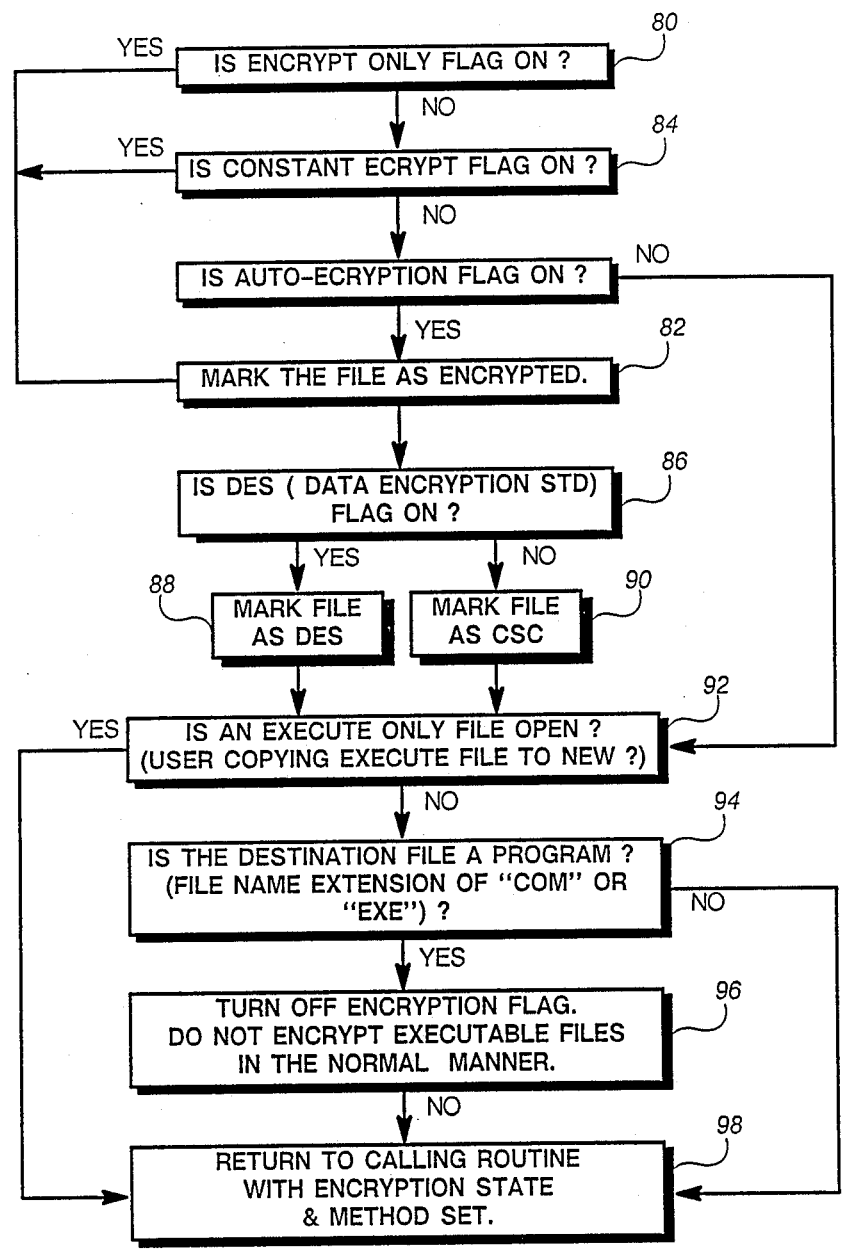
FIG. 6 is a flow chart showing the chain of processes performed by the security system of the present invention in deciding whether or not a new file being created is to be encrypted or not, and the type of encryption thereof the file.

As mentioned above, a normal user may be given the right to decide if each new file should be encrypted or should not be encrypted. In FIG. 6, the flow chart for determining the current status of the encryption is shown. Block 80 shows the first step where the calling routine asks to see the current state of the encrypt flag. If the encrypt flag is on, then the file is marked as encrypted, as shown in block 82. If the encrypt flag is not on, then constant encryption is checked for, as shown in block 84. If it is "on", then the file is marked as encrypted, as shown in Block 82. If constant encryption is not on, which is at the discretion of CSA, then it is checked to see if automatic encryption has been set by the CSA. If automatic encryption has been set ESTATUS program by the PROTECT program of the normal user if it is available to him, then the file will be marked as encrypted and will always be encrypted until it is de-crypted by the CSA, or by the user when the CSA allows him such rights. If any type of encryption is on, then the choice of which encryption method to use is made(blocks 88 and 90). Blocks 80-90 are the logical sequence of events that determine if a file being created is to be encrypted or not encrypted, and if encrypted, which encryption method should be used. Regardless if encryption has been set or not, the file being created must be checked for to see if it is an the EXECUTE ONLY flag is on, which means that the user is attempting to copy a file marked as "Execute-Only" to a new file (which must also be marked "Execute-Only" (block 92). If it is on, then encryption must be turned off, if it has been turned on, since program files are not encrypted in the normal manner. If the destination file is a program file(block 94), then the encryption must again be turned off, if on, as shown in block 96. The last block 98, shows that regardless of the encryption, return to the calling routine is carried. FIG. 6 shows the flow of decision when a new file created and it is must be determined by the system of the present invention if such new file is to be encrypted or not.

Some of the programs available to the CSA and normal users have already been mentioned above, such as ESTATUS, PROTECT, and the like. These programs are available to the PC owner or administrator on a floppy disc accompanying the hardware, in the form of an expansion board. The programs available to the normal user are:

ESTATUS
TOGGLE
DIR1
SETFILE
PASSWORD
PROTECT

The ESTATUS AND PROTECT program files have already been mentioned above, where ESTATUS is used to change the state of auto encryption, if the CSA has given such right by not opting for constant encryption of all file-groups being created, and has not provided for automatic encryption by the ADMIN program available only to the CSA. Like the other program files on the floppy disc, ESTATUS changes the status of the condition or state on the EEPROM provided on the expansion board of the present invention, to be described below in greater detail, access thereto being carried out via the BIOS 7CH interrupt vector of DOS as mentioned above. Of course, the files on the floppy may be copied to a fixed disc, if so desired. The TOGGLE program file is used to determine if a file to be created is to be automatically protected or not. This program file may or may not be allowed for each user, such being at the option of the CSA. This program is a very simple one and merely changes the status of each file being created to be protected or not be protected. This program may also be used to protect existing, non-protected files by first copying them to a new file via DOS copy command, which will thus automatically protect them since a new file is being created. If, however, one wants to protect a number of existing files at one time, the PROTECT program-file may be used, which is also a very simple one, that merely sets the protection flags for each file, one-by-one, rather than copying them individually via DOS copy command. This PROTECT file also allows a user to place the files being protected at one time into a chosen default file-group and default department, if such default file-group and/or department are different from that chosen via the SETFILE program.

The DIR1 program is another very simple program-file that lists the current status of the files of the user by file-group and by department, along with information about their status of being encrypted or not being encrypted since every file that belongs to a file-group is by definition protected, though it may or may not be encrypted. The SETFILE program, as previously mentioned, allows a user to change the default file-group and/or default department, such meaning the place where each newly-created file is to be classified. The PASSWORD program is used by a normal user to change his or her password for gaining access to DOS, which password is known by him or her in secret, not even the CSA knowing it. Each password is stored on the EEPROM of the expansion board of the present invention.

The programs available to the CSA, over and above those available to the normal user, are:

SETKEY
ADMIN
ADREPORT
OPTIONS
LOGGING
EDNAMES
LOGDUMP
IDENT
LOGPRINT
TABLEDUMP
CSCTIME

The SETKEY program is used to enter or change the changeable key used for encryption of the files. This changeable key is used in conjunction with the internal key when using the CSC proprietary encryption method. This changeable key is a set of eight alpha-numeric characters, and is used when utilizing the CSC, proprietary, algorithm of encryption. When using the conventiotal DES encryption method, only the changeable key is used, in the well-known manner.

The ADMIN program is that which allows total control by the CSS over the file-groups by user, in order to provide for access thereto and/or encryption thereof. The ADMIN program-file as shown in FIG. 4, will allocate user-access by file-group and department. All of the information that makes up the Resource Allocation Table is emplaced on the EEPROM, to which ADMIN has access via the 7CH BIOS interrupt, as explained above, for changing access rights and the like. ADMIN is also used to enable the entry of passwords, when a user is welcome, or to unenable when a user is not welcome. Also, as explained previously, this program allows for the insertion of constant protection by individual user, rather than globally for all users and can do the same for constant encryption by user and not for all users. Of course, if constant protection and/or constant encryption is "on" for the entire system, by the OPTIONS program, any entry via ADMIN shall be ignored. ADMIN can also be used to log all accesses to individual file-groups if the global, system-wide option to log has not been chosen(see LOGGING below).

The ADREPORT program-file is simply a program that will print a report listing the Resource Allocation Table of FIG. 4.

The OPTIONS program-file has been discussed previously, and allows the CSA the system-wide option of choosing constant encryption and/or constant protection, for which neither the ADMIN program nor the PROTECT program may alter. It simply sets the protection and encryption flags "on" or "off", which either ensures that all newly created files will or will not be protected and/or encrypted without any user having power to alter the states so chosen. This program will, also, allow the choice of which encryption method to use: Whether the DES standard method, or the proprietary CSC method. This program also is used to set password expiration time, such as one month hence, or the like. Finally, this program may be used to shut the system of the present invention off, so that the PC may be used with an operating system other than MS-DOS, such as P-system Pascal, or CP/M, or when DOS is not used, such as when running a flight-simulator program, or the like.

Figure 7:
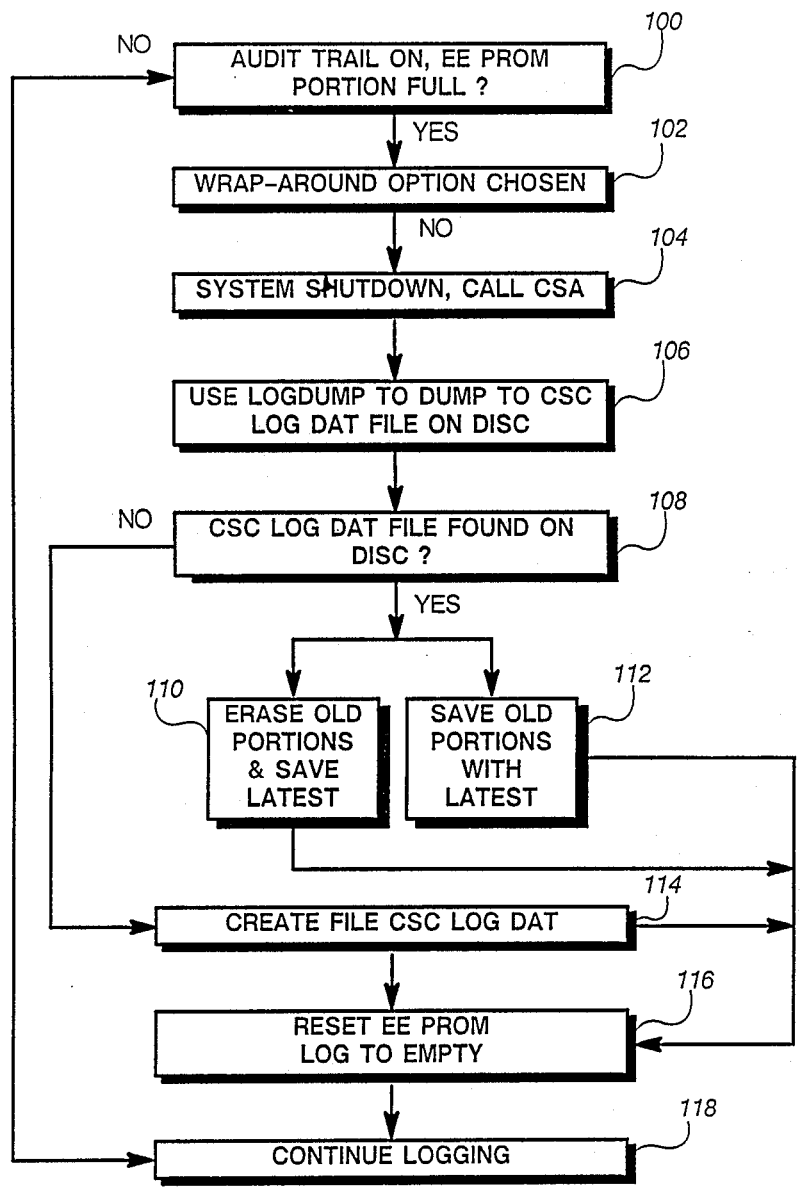
FIG. 7 is a flow chart showing the decision making process of the Central Security Administrator in deciding the type of audit trail he so desires, if one is chosen, and his options when the audit trail is full on the EEPROM on which it is stored.

The LOGGING program-file includes a program for setting the audit trail, which keeps track of all time and dates of accesses to all files as well as all log-ons to the PC itself. There are six main logging options provided for with LOGGING program. These are: a time stamp at log-on/log-off; log-on account number, which requires an account number be entered at log-on for each user, so as to enable one to track the time spent on various activites, which may be used for client billing, or job costing, and the like; log all file accesses, which records the fact that a protected file has been opened by a valid user or an invalid attempt to access a protected file occurred; log all illegal attempts, which duplicates the logging all access option, but which may be used if not all access attempts are to be logged; logging all changes to passwords; and continuing the log when it is full, wrapping around and erasing earlier entries. If this last option were not used, when the logging file is full, further use of the PC will not be allowed until the CSA has dumped the log to a file and reset the log (this is accomplished by the LOGDUMP program to be described below). If the CSA does not want to lose any log entries, he may choose to halt the system when the log is full. It is noted that this audit trail, whatever its contents, is stored on a section of EEPROM, the same EEPROM described above for storing the passwords, flags, etc. Also, as just described, the LOGDUMP program is available to the CSA for dumping the audit trail contents of the EEPROM into a separate file therefor. This program must be used when the log-wrap-around is not chosen as an option in the LOGGING program, for otherwise the system will stay shut down. A file created on disc for the contents of the logging entries, called CSCLOG.DAT, will continually accept new data from the dumped logging entries, with the LOGDUMP program allowing erasure of previously stored logging information, or allowing the keeping thereof. This LOGDUMP program is also used to erase the contents of the audit trail on the EEPROM. FIG. 7 shows the flow of decision for logging that is open to the CSA, in deciding whether or not to use wrap-around or not, as well as using the LOGDUMP program for resetting the audit trail and for the saving thereof. Block 100 shows whether or not the log on EEPROM is full. If it is not, then normal logging procedure continues, with whatever logging options having been chosen. If the log is full, then if the wrap-around option was chosen, logging continues also for the earliest log contents are erased(FIFO). If the wrap-around was not chosen, and the half-system option was chosen, then the system shall shut down. Blocks 100,102 and 104 show the flow through the use of system-halting. Regardless if halt-system option is used, the CSA must come and dump the contents of the log to a file using the LOGDUMP program(block 106) for transference to the CSCLOG.DAT file on disc(block 108). If that file already exists, then the choice open by LOGDUMP is to save all the old trail with the newest being added(block 112), or save only the newest(block 110). If that file is not already on disc, then LOGDUMP will create that file(block 114). Regardless if the file is on disc or not, the EEPROM portion for the audit trail is reset to empty (block 116), and the logging continues(block 118).

The EDNAMES program is a very simple program that simply allows the CSA to label, or give names, to each file-group and department.

The IDENT program is used to provide protection for proprietary software against unauthorized use. In essence, each proprietary program may be given a serial number, typically of 6 alpha-numeric characters, with each serial number being placed in memory. Thus, each proprietary software includes a loop that first checks for the correct serial number, which the CSA may choose. If the correct serial number is not present in the machine, the program will not run. As mentioned above, all functions of Sentinel are achieved through the BIOS 7CH interrupt. Thus, the CSA will first enter the serial number for a particular proprietary program via the IDENT program, which he stores in memory for later validation when a user tries to use that program. As with the other 7CH functions, the contents of AH register of the central processing unit shall be set forth below, along with the inputs and outputs thereof. A serial number may also be used to identify the PC to remote devices such as a main frame. In the preferred embodiment, four such serial numbers codes may be set and used, either for protection of proprietary software, or for PC identification.

The TABLEDMP program is a program available to the CSA by which several PC's may be set up in the same way using the security system of the present invention. After a first PC has been installed with the system of the present invention with the options and audit trail chosen and set, along with the passwords, and resource allocation table, the CSA may run this program to transfer the information on EEPROM of the Sentinel card to a file on disc, which may then be transferred back to another Sentinel card installed in place of the first one, to thus duplicate it. A number of cards may be "uploaded" in this manner, so that a number of PC's, all under the control of the CSA, may be provided for multi-user access, with the appropriate protection and/or encryption of the files thereof. When uploading each new Sentinel card, that new card must then be installed without using the INSTALL program for installing the cards in the new PC, as will explained below, for, otherwise, a security breach will have been initiated.

As mentioned above, all functions of the security system of the present invention are accessed by DOS via the 7CH interrupt. Below is a table listing all of the 33 functions of "Sentinel", showing the AH register contents, along with the input and output. The AH register is the most significant byte of the AX(accumulator) register; the AL register is the least significant byte of the AX register; BL is the least significant byte of the base register(BX); BH is the most significant byte of the BX register; CH is the most significant byte of the count register(CX); DL is the least significant byte of the data register(DX), and DH is the most significant byte of the DX register; DS is the data segment register; DI is the destination index register; and SI is the source index register. All values are in hexadecimal.

[!!!] Sentinel Interrupt [int 7Ch] Handler:    [INT7C.FL0]

If you are familiar with programming in the PC-DOS/MS-DOS operating environment, you know that all proper accesses to the operating system for I/O, file management, memory management, etc. are made through the DOS function calls by executing a software interrupt hex 21 with the AH register containing the function number ( and the other processor registers set according to the needs of the function call ). Sentinel function calls are made in the same way, except you use interrupt hex 7C.

The Sentinel functions are as follows with all values in hexadecimal.

Using DOS software interrupt number 7C(hex), the contents of the AH register determines the function called:

---

| AH = 1 |

Function 1: REQUEST USER NUMBER

IN : Nothing
OUT: AL = the current user number. [1..22]

---

| AH = 2 |

Function 2: SET PROTECTION FLAG

IN: AL = 1 (set protection flag to "on")
    AL = 0 (set protection flag to "off")
OUT: Nothing

---

| AH = 3 |

Function 3: GET STATUS OF AUTO FLAGS

IN: Nothing
OUT: AL = 1 (Auto protection is "on")
     AL = 0 (Auto protection is "off")
     AH = 1 (Auto encryption is "off")
     AH = 0 (Auto encryption is "on")

---

| AH = 4 |

Function 4: VALIDATE SERIAL NUMBER

IN: DS:DI points to a 6 byte serial number string to verify.

OUT: Carry Flag = false, & AL = 0 if found.
     Carry Flag = true,  & AL = 3 if not found.

| AH = 5 | Function 5: RETURN SERIAL NUMBER |

IN: AL = Serial number position. [1..4]
      (position in list of serial numbers)
    DS:DI points to a 6 byte buffer area.
OUT: Serial number string in user buffer area

---

| AH = 6 | Function 6: RETURN FILE GROUP & DEPARTMENT |

IN: DS:DX points to ASCIIZ Pathname with the filename of the file to check.

OUT: AH = Departmental set membership byte.
    AL = File group number.
    AL = 0 means the file is not protected.
    BL = Encryption state:
        1 = file is not encrypted
        2 = encrypted by CSC method
        4 = encrypted by DES method
        bit 4 set = "Encrypt Only" file
Carry Flag = true if file not found

---

| AH = 7 | Function 7: ENVOKE PASSWORD INPUT (LOG OFF) |

No input or output. Simply calls up the password entry screen, and hangs the system until a valid password in entered. (If the logging option is selected, log off time stamp is added.)

---

| AH = 8 | Function 08: GET DEFAULT FILE GROUP & DEPARTMENT |

IN : Nothing
OUT: AL = FILE GROUP #
    AH = DEPARTMENTS (BIT 0 = DEPT 1)

---

| AH = 9 | Function 09: SET FILE MARK: |

IN: AL = FILE GROUP #
    DL = DEPARTMENTS

---

| AH = 0A | Function 10: GET PW STATUS: |

IN: AL = PW #
OUT: AL = 00 (OPEN SLOT)
        FF (CLOSED SLOT)
        01 (VALID PW )
    AH = 00 (NORMAL USER)
        01 (CONSTANT PROTECTION)
        02 (CONSTANT ENCRYPTION)
        03 (BOTH)

---

| AH = 0B | Function 11: SET PW STATUS: (SECURITY ADMIN. ONLY) |

IN: AL = USER #
    DL = 00 (OPEN A SLOT)
        FF (CLOSE A SLOT)
    DH = 00 (NORMAL USER)
        01 (CONSTANT PROTECTION)
        02 (CONSTANT ENCRYPTION)
        03 (BOTH)

---

| AH = 0C | Function 12: GET USER ACCESS RIGHTS: |

IN: AL = FILE # [1..64]
    DL = PW # [1..20] ( USER # )
    DH = FILE SET BYTE
OUT: AL = 0 = NO EXCEPTION
        1 = NO ACCESS
        2 = READ/ONLY
        3 = READ/WRITE
    AH = 1 = LOGGING ON (0 = OFF)

---

| AH = 0D | Function 13: SET USER ACCESS RIGHTS (SECURITY ADMIN. ONLY) |

IN: AL = FILE # [1..64]
    DL = PW # [1..20]

```
                   DH = RIGHTS: 0 = NO EXCEPTION   4 = W/LOG ON
                                1 = NO ACCESS     5 = W/LOG ON
                                2 = READ/ONLY     6 = W/LOG ON
                                3 = READ/WRITE    7 = W/LOG ON
```

---

| AH = 0E |

Function 14: GET USER'S SET ACCESS RIGHTS:

IN:    AL = SET # [0..7]
           ( DL & DH SAME AS FUNCTION 0C )
    OUT:   ( SAME AS FUNCTION 0C )

---

| AH = 0F |

Function 15: SET USER'S SET RIGHTS
                        (SECURITY ADMIN. ONLY)

IN:    AL = SET # [0..7]
           DL = PW # [1..20]
           DH = RIGHTS:  (SAME AS FUNCTION 0Dh )

---

| AH = 10 |

Function 16: SET PASSWORD

IN:  AL = PW SLOT [1..22]
         DS:SI--> 8 BYTE PASSWORD
    OUT: AL = 0 (ALL OK)
              2 (PW SLOT CLOSED)
              3 (NOT YOUR SLOT )
              4 (PW MATCH'S ANOTHER'S )
                (AH  = OTHER SLOT )

---

| AH = 11 |

Function 17: SET SERIAL # (SECURITY ADMIN. ONLY)

IN:    AL = WHICH SERIAL #
           DS:SI-> 6 BYTE SERIAL NUMBER

---

| AH = 12 |

Function 18: VERIFY USER ACCESS RIGHTS:
                        ( Checks both sets and groups )

IN:    AL = FILE # [1..64]
           DL = PW # [3..22] ( USER # )
           DH = FILE SET BYTE
    OUT:   AL = 0 = NO EXCEPTION
                1 = NO ACCESS
                2 = READ/ONLY
                3 = READ/WRITE
           AH = 1 = LOGGING ON (0 = OFF)

---

| AH = 13 |

Function 19: GET SYSTEM FLAGS:

IN :   NOTHING
    OUT:   AL = FLAGS1  (1 IN BIT POSITION = ON )
                    BIT 0 = CONSTANT PROTECT ON
                    BIT 1 = CARD OFF
                    BIT 2 = DES ON
                    BIT 3 = MONITOR LOG-ON
                    BIT 4 = MONITOR ACCT #
                    BIT 5 = MONITOR FILES
                    BIT 6 = MONITOR ATTEMPTS
                    BIT 7 = MONITOR PW CHANGES
           AH  = FLAGS2
                    BIT 0 = HAS DES OPTION
                    BIT 1 = ALLOW "LOG WRAP"
                    BIT 2 = STOP WHEN LOG FULL
                    BIT 3 = CONSTANT ENCRYPT ON
                    BIT 4-6 = UNUSED
                    BIT 7 = PW'S ENTERED
           BL = PASSWORD EXPIRATION TIME (DAYS)
           BH = Account number size

---

| AH = 14 |

Function 20: SET SYSTEM FLAGS:
                        (SECURITY ADMIN. ONLY)

IN :   AL = FLAGS1  (SEE ABOVE FOR BIT MAPPING)
           DL = FLAGS2
           DH = ACCOUNT NUMBER LENGTH
    OUT:   NOTHING

---

| AH = 15 |

Function 21: GET LOGGING TABLE INFO:
                        (SECURITY ADMIN. ONLY)

IN :   NOTHING

```
         OUT:   CX = SIZE OF TABLE IN BYTES
                AX = CURRENT END OF TABLE (LOG POINTER)
```

[AH = 16]       Function 22: SET LOGGING STATUS:
                             (SECURITY ADMIN. ONLY)

```
         IN :   NOTHING
         OUT:   AL = LOG STATUS BYTE:
                       BIT 0 = ILLEGAL ATTEMPT
                       BIT 1 = LOG FULL
                       BIT 2 = HAS WRAPPED (0=RESET)
                AH = # OF CHARACTERS IN ACCOUNT NUMBER
```

[AH = 17]       Function 23: RESET LOG TABLE:
                             (SECURITY ADMIN. ONLY)

```
         IN,OUT: NOTHING (SIMPLY SETS LOG TABLE TO "EMPTY")
```

[AH = 18]       Function 24: DUMP LOGGING TABLE:
                             (SECURITY ADMIN. ONLY)

```
         IN :   DS:DI --> USER'S BUFFER AREA
         OUT:   LOG TABLE --> USER'S BUFFER
                ( 050Ch = 1292 BYTES VERSION 3.00 )
```

[AH = 19]       Function 25: SET PASSWORD EXPIRATION TIME:
                             (SECURITY ADMIN. ONLY)

```
         IN :   AL = TIME IN DAYS [0,.255] 0 = DON'T BOTHER
```

[AH = 1A]       Function 26: SET ENCRYPTION KEY:
                             (SECURITY ADMIN. ONLY)

```
         IN :   DS:DI --> USER'S BUFFER AREA
         OUT:   8 BYTE ENCRYPTION KEY
```

[AH = 1B]       Function 27: SET ENCRYPTION KEY:
                             (SECURITY ADMIN. ONLY)
```
         IN :   DS:SI --> 8 BYTE ENCRYPTION KEY
         OUT:   NOTHING
```

[AH = 1C]       Function 28: SET USER ENCRYPTION STATUS:
                             (SECURITY ADMIN. ONLY)

```
         IN :   AL = PW #
                DH = STATUS: 00 = NORMAL USER
                             01 = CONSTANT PROTECTION
                             02 = CONSTANT ENCRYPTION
                             03 = BOTH
         OUT:   NOTHING
```

[AH = 1D]       Function 29: DUMP TABLES & PW'S:
                             (SECURITY ADMIN. ONLY)

```
         IN :   DS:DI --> CALLER'S BUFFER AREA
         OUT:   ALLOCATION TABLE, PASSWORDS, FLAGS, ETC.
                (02F4h BYTES = ALLOW ROOM FOR 800 BYTES)
```

[AH = 1E]       Function 30: UPLOAD TABLES & PW'S: (S.A.'S ONLY)

```
         IN :   DS:SI --> CALLER'S BUFFER AREA WITH
                ALLOCATION TABLE, PASSWORDS, FLAGS, ETC.
                (02F4h BYTES = ALLOW ROOM FOR 800 BYTES)
         OUT:   NOTHING
```

[AH = 1F]       Function 31: SET AUTO ENCRYPT FLAG

```
         IN :   AL = 0 = SET FLAG ON (ENCRYPT)
                AL = 1 = SET FLAG OFF (DO NOT ENCRYPT)
```

[AH = 20]       Function 32: GET COLOR INFORMATION

```
         IN :   Nothing
         OUT:   AL = background color [0..15]
```

```
                            BH = Text color
                            BL = Highlight color
─────────────────────────────────────────────────────────────

[AH = 21]              Function 32: SET COLOR INFORMATION

IN :    AL = background color [0..15]
                   DH = Text color
                   DL = Highlight color
─────────────────────────────────────────────────────────────

[AH = 22]              Function 33: GET DATE & TIME

OUT:    AH = MONTH
                   AL = DAY
                   BH = HOUR
                   BL = MINUTE
                   CH = YEAR
─────────────────────────────────────────────────────────────

[AH = 23]              Function 33: SET ENCRYPT ONLY FLAG

IN :    AL = 0 = Turn off
                        1 = turn on
                        FF = request status of flag
           OUT:    if AL = FF, AL = current state of flag
─────────────────────────────────────────────────────────────

Error Codes:    If an error occurs, the Carry Flag returns true
                and the AL register contains the Error number:

AL = 1;  Invalid function call ( or not S.A. )
                AL = 2;  File not found
                AL = 3;  Serial number not found
```

Figure 8:
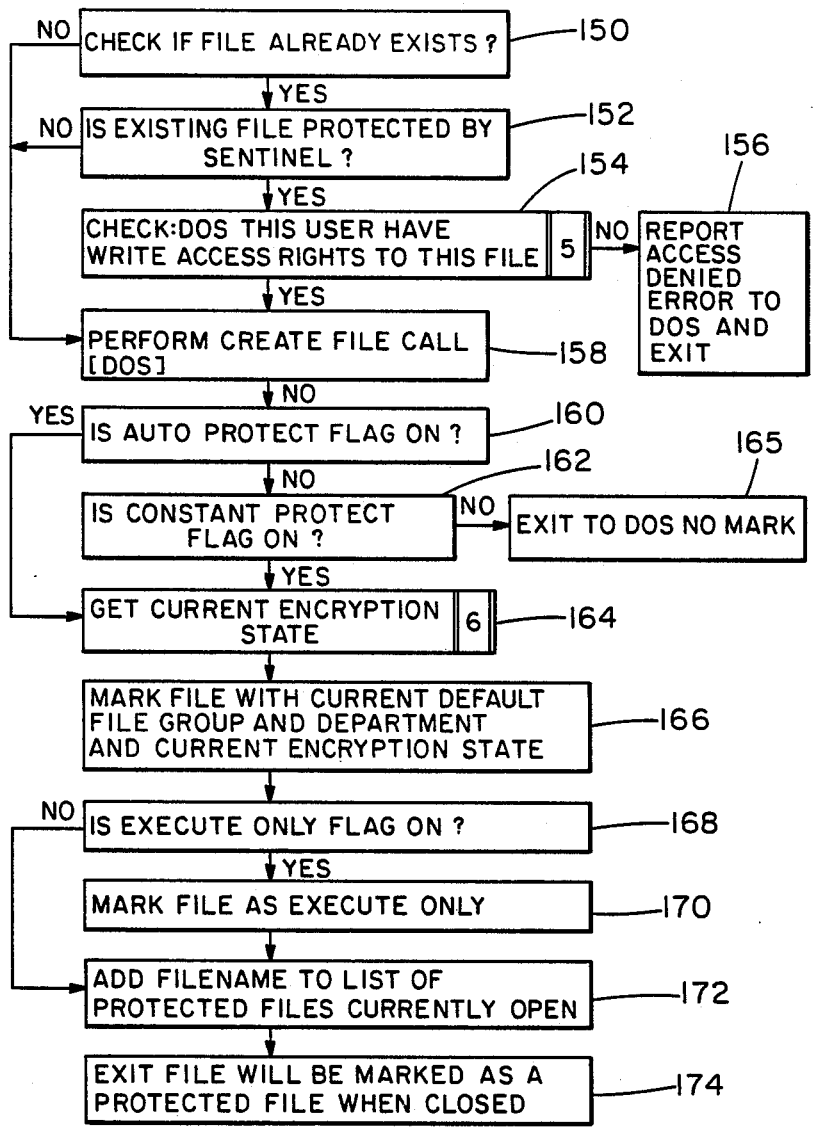
FIG. 8 is a flow chart showing the chain of decisions that the security system of the present invention makes when a DOS 21H interrupt "Create a File" function call is made, such that security system of the present invention monitors such call to determine if the user and file are compatible.

As shown in FIG. 3, as mentioned previously, each of the 22 DOS 21H functions calls shown in monitored by "Sentinel". The function calls are further broken down according to DOS 1.00, DOS 2.00, and DOS 3.00. The column listed as "Flow Chart Reference" refers to the figure where the flow chart for that function is shown. FIG. 8 is a flow chart for the DOS function call to create a new file in conjunction with the "Sentinel" safety system (the object code for the flow of events is contained on the EPROM, to be discussed below, of the card of the present invention). Block 150 will check to see if the file already exists, as is the standard procedure. If the file exists, then it is checked to see if it is protected or not(block 152). If it is protected, and the user does not have "write-access", acess is denied (blocks 154 and 156). If the file is new, or if it is not protected, then "Sentinel" allows DOS to create the file. If it is protected but user has "write-access", then DOS will be allowed to create a file(block 158). The next blocks determine the flags to be set for the created file. Block 160 shows that Sentinel checks for automatic protection, and if the automatic flag is set for that user, then that file is marked with the current default group and default department for the user(block 166). If the automatic protection flag is not on, but the constant protection flag is on(by the OPTIONS program rather than by the ADMIN program), as shown in block 162, then the file will be marked with the current default group and default department for the user (block 164). Otherwise, no mark is set(block 165). Block 164 also indicates FIG. 6, indicating that the flow chart in that figure determines the encryption status of the file by the subroutine shown therein. If there is no protection at all for that user, then block 165 shows that the routine ends and exit to DOS follows, and does not check for encryption, since the file is not a protected one, and since regardless if it is protected or not, if the "encrypt only" flag has been set, the file will automatically be protected, while if such flag has not been set, then the file will not be encrypted (see block 80 in FIG. 6). It is noted that the "Encrypt Only" flag means that for a file with the flag therefore set to this state, the file cannot be decrypted, unless the CSA turns this flag off. After block 166, when the encryption state has been set and the default file and department have been set, block 168 checks for the "Execute Only" flag, which means that if such has been set, that file being created may not be copied. If the flag has been set, then the file is marked so(block 170), and if it has or has not been, the filename is added to the list of protected files (block 172), after which exit to DOS occurs(block 174).

Figure 9:
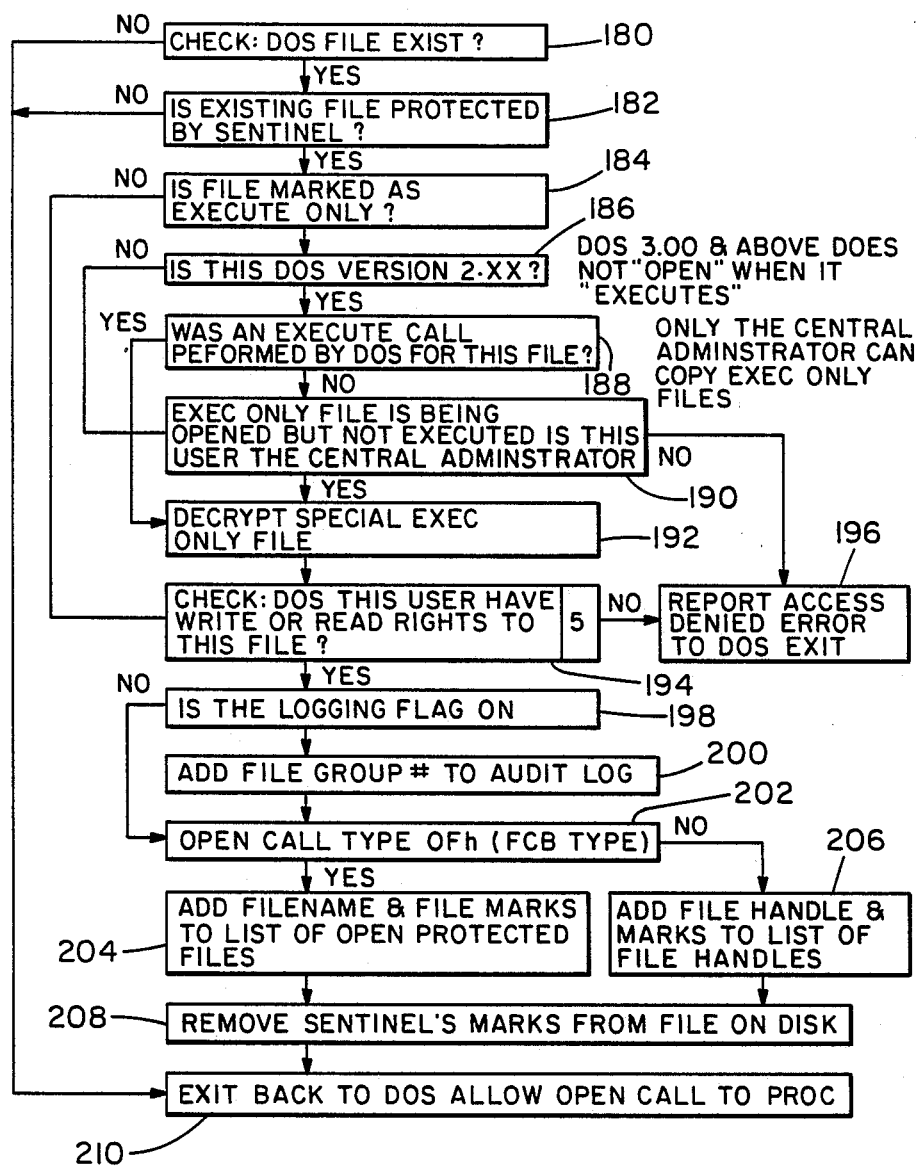
FIG. 9 is a flow chart showing the chain of decisions that the security system of the present invention makes when a DOS 21H interrupt "Open a File" function call is made, such that the security system of the present invention monitors such call to determine if the user and file are compatible.

FIG. 9 is a flow chart for the DOS interrupt function openign a file(DOS function call OFH and 3DH). Blocks 180 and 182 check to see if the file being opened exists or is protected. If it is no for either block, then the routine exits back to DOS. IF the file is protected, then is it a file marked "Execute Only", meaning it cannot be copied. If it is not, then write or read access is checked for (block 194). If he does not, then an error is reported to DOS. If he does, then the logging status is checked (block 198), which is followed by block 200 indicating that logging then will be carried out. If the logging flag is not on or is on, the type of call is checked, to see if it is an OFH call, which is a FCB(File Control Block) type of call(block 202). If it is, then the file will be added to the list of protected files(204). If it is not a OFH call, but is a file handling function of DOS 2.00, then the file handles and marks will be added to the list of file handles. If the file is an "Execute Only" file, (block 184), then the version of DOS is checked for. If it is not DOS 2.00, then it is DOS 3.00 and block 190 checks to see if the current user is the CSA or not. If he is not, an error message is sent to DOS (block 196). If it is, then the file is decrypted(block 192), at which point write and read access is again checked for(block 192), as before. If it is not DOS 3.00, but DOS 2.00, then block 188 checks to see if an "Execute Call" was perfomed by DOS(block 188), and if it was, then the file is decrypted. If it was not, then block 190 again checks to see if it is CSA.

Figure 10:
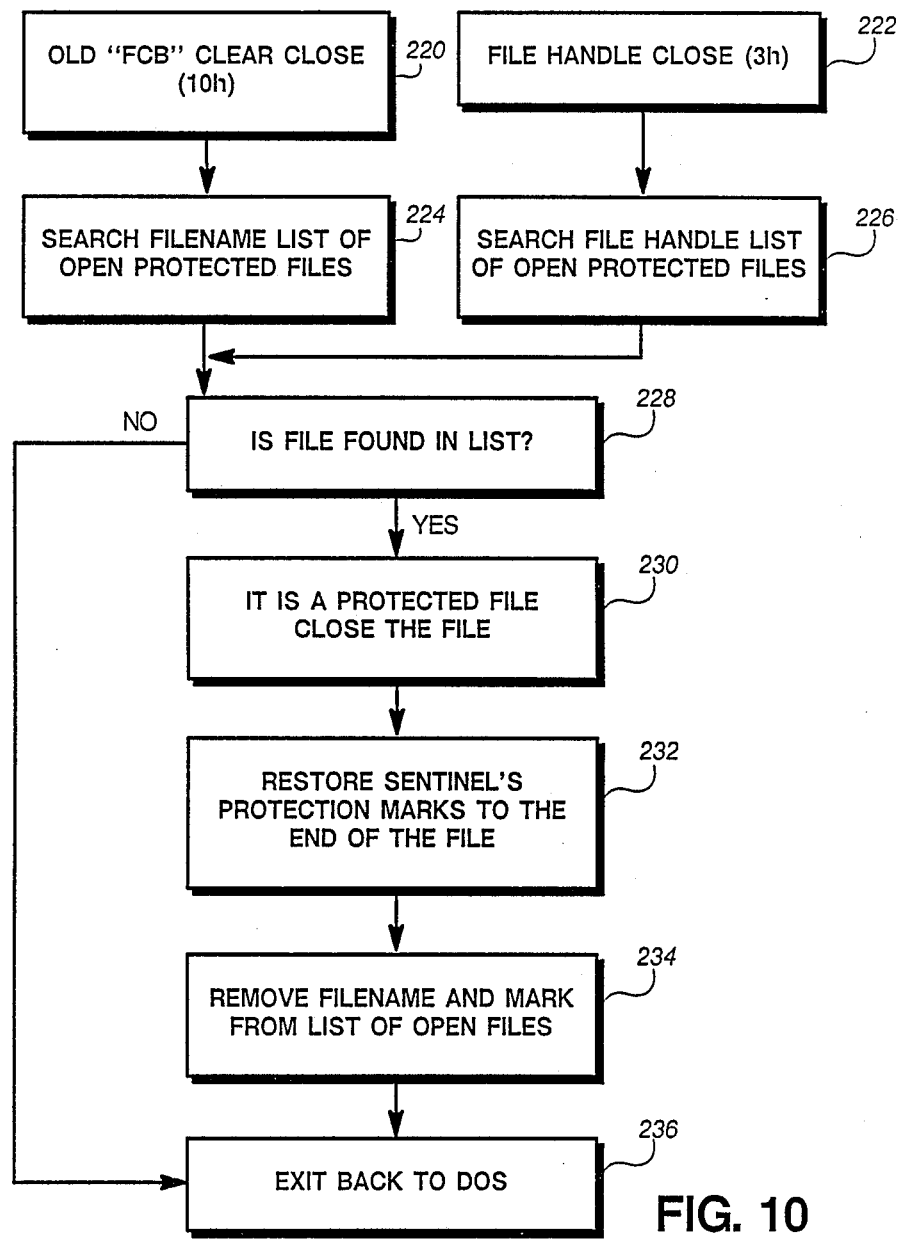
FIG. 10 is a flow chart showing the chain of decisions that the security system of the present invention makes when a DOS 21H interrupt "Close a File" function call is made, such that the security system of the present invention monitors such call to determine if the user and file are compatible.

FIG. 10 shows the flow chart for the "Close File Call" (DOS function call 10H and 3EH). A search is made of the open, protected files (block 226). If the file is found (block 228), then the file is closed and appropriate marks are added at the end of the file, with a concomitant removal of the file from the list of open files (blocks 228 through 234). Exit to DOS ensues(block 236).

Figure 11:
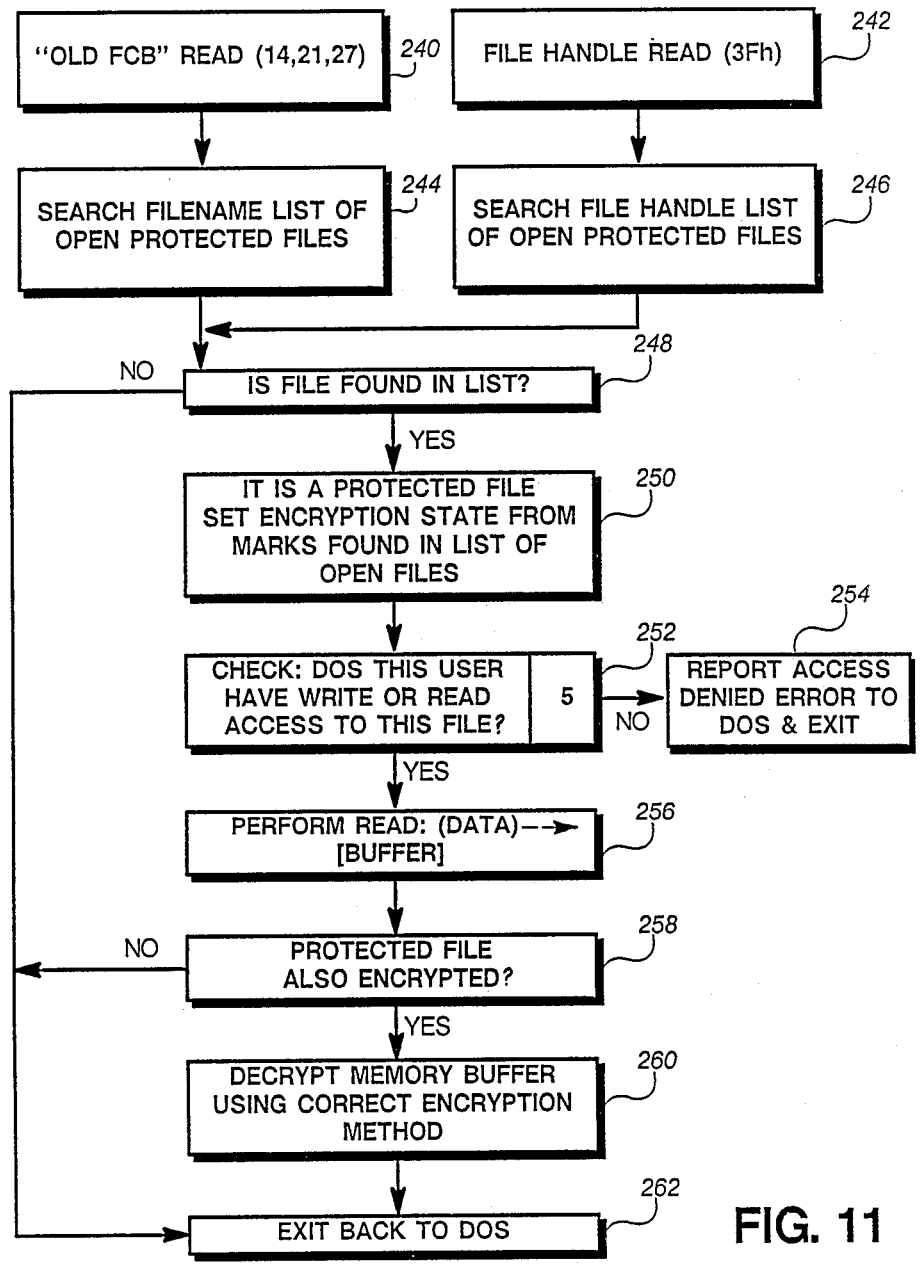
FIG. 11 is a flow chart showing the chain of decisions that the security system of the present invention makes when a DOS 21H interrupt "Read a File" function call is made, such that the security system of the present invention monitors such call to determine if the user and file are compatible.

FIG. 11 is a flow chart for the "Read File Call" (DOS function calls 14h, 21H, 27H, and 3FH). Depending upon the version of DOS, a check is made of the open protected files (blocks 240,242,244,246). If the file is not found (block 248), then exit to DOS occurs (block 262). If the file is found, then block 250 checks for encryption (block 250), which is set for that file. Write or read-access is then checked (block 252), according to the flow chart of FIG. 5, and if the user does not have access, then an error message is sent to DOS (block 254). If he does have read or write access, then read-access is allowed and the "read" is performed (block 256). Block 258 indicates the condition of encryption. If it is encrypted, then the memory is decrypted (block 260), and exit to DOS ensues. If it is not encrypted, then exit to DOS ensues without decryption.

Figure 12:
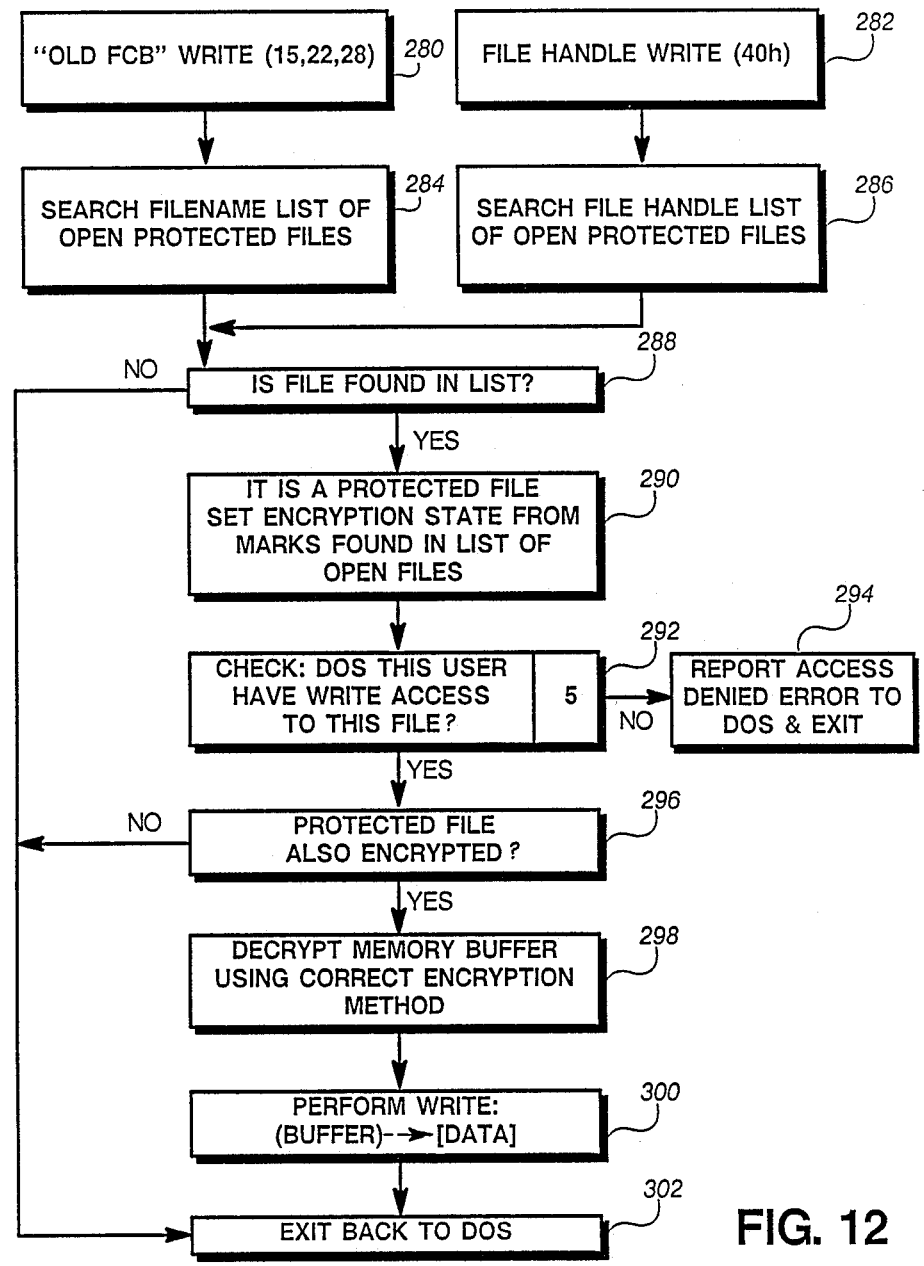
FIG. 12 is a flow chart showing the chain of decisions that the security system of the present invention makes when a DOS 21H interrupt "Write a File" function call is made, such that the security system of the present invention monitors such call to determine if the user and file are compatible.

FIG. 12 shows the flow chart for a "write-call", DOS function calls 15H, 22H, 28H, and 40H. As before, depending upon the version of DOS used, the file is searched for to see if it is an open protected file (blocks 280,282,284, and 286). If the file is not found (block 288), exit to DOS ensues(block 302). If the file is found, then block 290 determines the status of encryption and sets it. Again, write-access is checked for in block 292, and if not present, access is denied with an error message sent to DOS (block 294). If write-access does exist, then block 296 determines the state of encryption. If the file is not encrypted, then return to DOS follows. If the file is encrypted, then the memory is decrypted with the correct encryption method (block 298). The performance of the writing is then carried out (block 300), and return to DOS follows.

Figure 13:
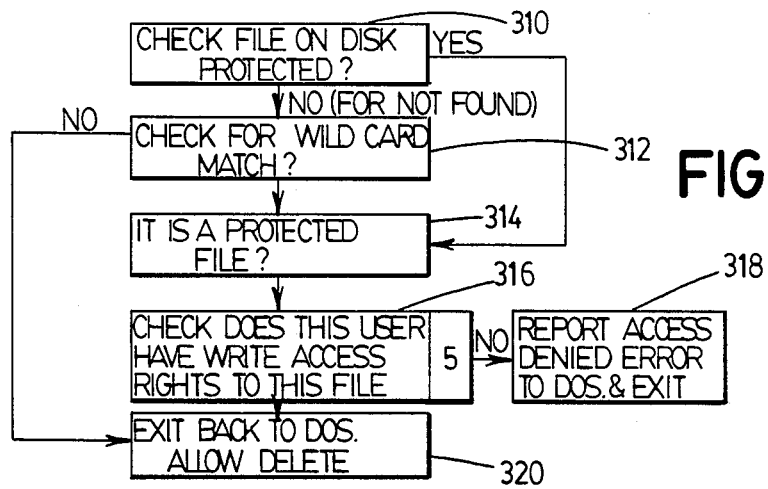
FIG. 13 is a flow chart showing the chain of decisions that the security system of the present invention makes when a DOS 21H interrupt "Delete and Rename File" function call is made, such that the security system of the present invention monitors such call to determine if the user and file are compatible.

FIG. 13 is a flow chart for the "Delete and Rename" DOS 21H interrupt function (DOS function calls 13H, 17H, 41H, and 56H). Block 310 indicates that the file to be deleted or renamed is checked on the disc to see if it is protected. If it is not found, then simple return to DOS follows (block 320). If it is found, and it is protected, (block 314), then block 316 checks to see if write-access is allowed for the user. If not, an error message is reported to DOS (Block 318), and if the user has write-access, exit to DOS follows with the deletion or renaming of the file allowed.

Figure 14:
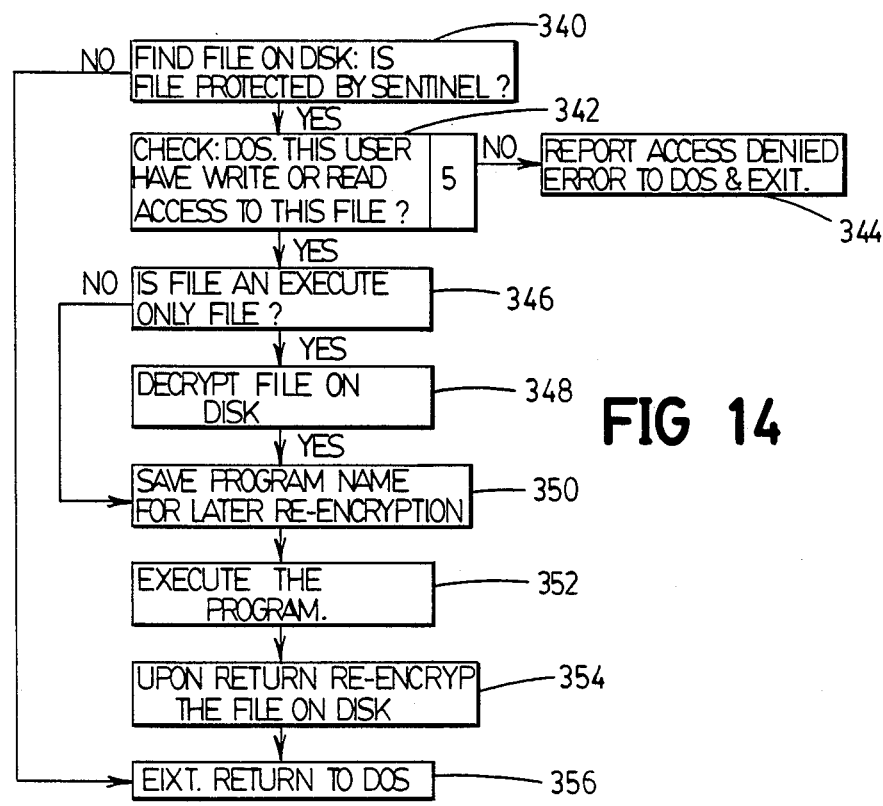
FIG. 14 is a flow chart showing the chain of decisions that the security system of the present invention makes when a DOS 21H interrupt "Execute a File" function call is made, such that the security system of the present invention monitors such call to determine if the user and file are compatible.

FIG. 14 is a flow chart for the DOS function call "Load or Execute a Program", DOS function call 4BH (for DOS 2.00 and above). Block 340 checks to see if the file is found on disc, and protected by Sentinel. If not, return to DOS follows (block 356). If it is found and protected, then write and read-access is checked for the user (block 342), and if he does not have access rights, an error message is sent to DOS (block 344). If he does have access rights, block 346 checks to see if the file is an "Execute Only" file. If it is not, then the program name is saved in RAM on the circuit board (block 350) for later checks during the DOs open call, and then executed (block 352). Upon return, the file is re-encrypted on disc (block 354), and exit to DOS follows (block 356). If it is an "Execute Only" file (block 346), then the file is first decrypted on disc(block 348), and then named for later reencryption.

All of the 21H interrupt calls are made through the security system of the present invention, which monitors these calls, as explained above with respect to each flow chart for the particular function call. The 21H interrupt handlers for all of the function calls are included on a portion of the EPROM provided on the expansion card of the invention. The object code contained therein monitors these 21H function calls shown in FIG. 3, and performs the routines above-described and shown in the drawing. The system flags, as well as the passwords, and other system parameters that may be altered, are contained on the cards's EEPROM, with the BIOS 7CH interrupt being used by the programs of the invention on floppy disc to access them and set the parameters and information necessary for the object code programs on the EPROM. Thus, there is a united and coherent system of hardware and software tied inseparably together, where one cannot function without the other, and which provides a practically foolproof system of security.

Figure 15:
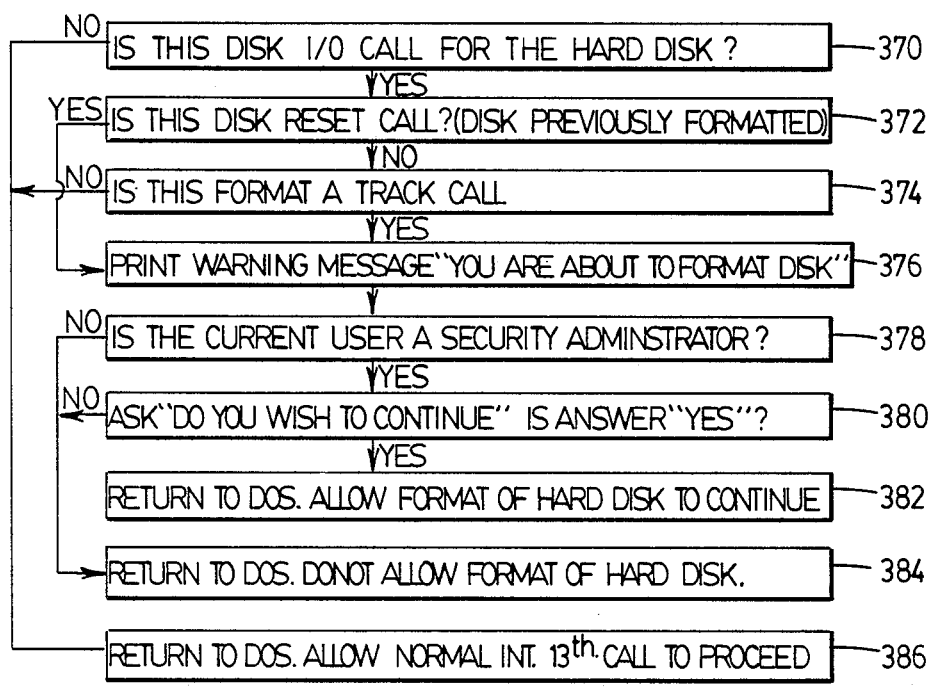
FIG. 15 is a flow chart showing the decision making process made by the security system of the present invention when hard-disc-formatting is attempted under the DOS 13H interrupt handler.

The security system of the present invention also provides format protection of hard discs, so that accidental or intentional formatting of hard disc is safeguarded, so that hard-earned data is not lost. Access to the disc, on a formatting basis, is done by track, sector, and disc read/write head, rather than by file-basis as in DOS interrupt 21H. Formatting is accomplished by the 13H BIOS interrupt vector, which is the lowest level of disc access available. In this 13H interrupt, when the AH register contents is 01H, the function is to reset the disk system, which is used when errors have been made therein. When the contents of the AH register is 05H, the function is to format the desired track on disc, with the ES (Extra Segment) register and the BX (base) register pointing to a format-information buffer-(ES:BX). This buffer holds a series of fields of data, one for each sector on the track. Each field is four bytes long, holding track number, head number, and sector number, followed by a byte indicating how long the sector is. There is one field for each sector on the track. The security system of the present invention will monitor this BIOS 13H interrupt for the 0H and 5H function calls, in the manner shown in FIG. 15. Block 370 indicates the beginning of the routine where it is determined if the disc I/O call is for the hard disc. If it is not, then the routine returns to DOS (block 389b), since access to the hard disc is not sought. If, however, access is to the hard disc, then block 372 indicates the portion of the routine where it is checked to see if the function call is 01H (resetting of hard disc). If it is not, block 374 is the portion of the routine to check to see if the call is a 05H function call for formatting a track of the hard disc. If it is a reset call (01H) or a format call (05H) then a warning message is printed out indicating that formatting of the hard disc is about to occur, to give time to the user to make sure he is doing what he intends (block 376). If the call is not a format-a-track call, then return to DOS follows. After the warning message has been printed, the routine checks to see if the current user seeking access is the CSA or not (block 378). If he is not the CSA, then formatting of the disc is not allowed (block 384), and return to DOS follows. If he is the CSA, then the routine simpy asks (block 380) if he wants to continue, to give him a chance to reconsider, so as to prevent erasure of available data if such access is not intended. If the CSA states "no", formatting is not allowed, and return to DOS follows. If he states "yes", return to DOS follows, and the interrupt is allowed to continue with formatting of the disc, as desired.

Figure 16:
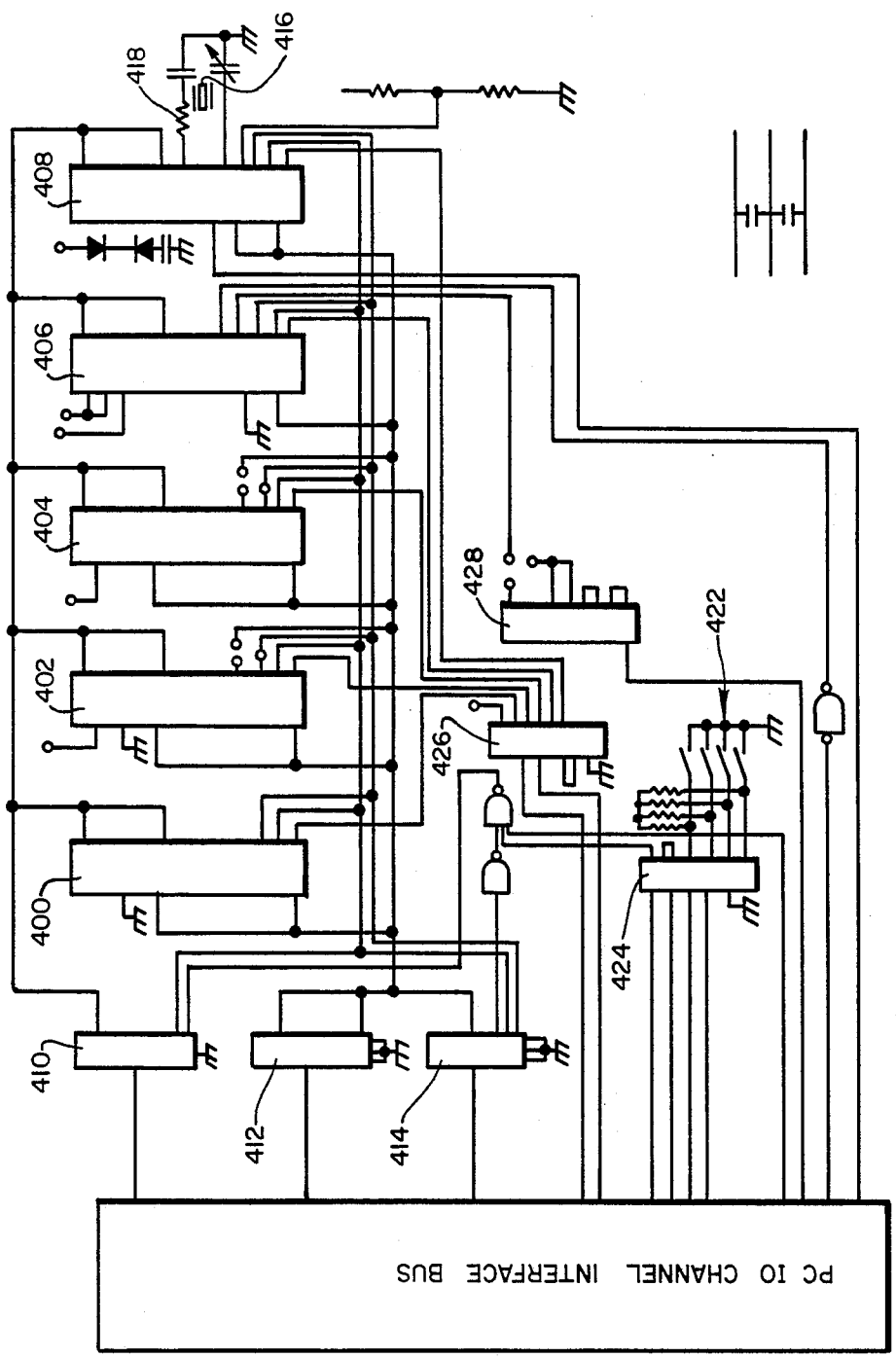
FIG. 16 is a schematic diagram showing the expansion board constituting the hardware portion of the security system of the present invention for insertion into an expansion slot of the personal computer to be protected.
Figure 17:
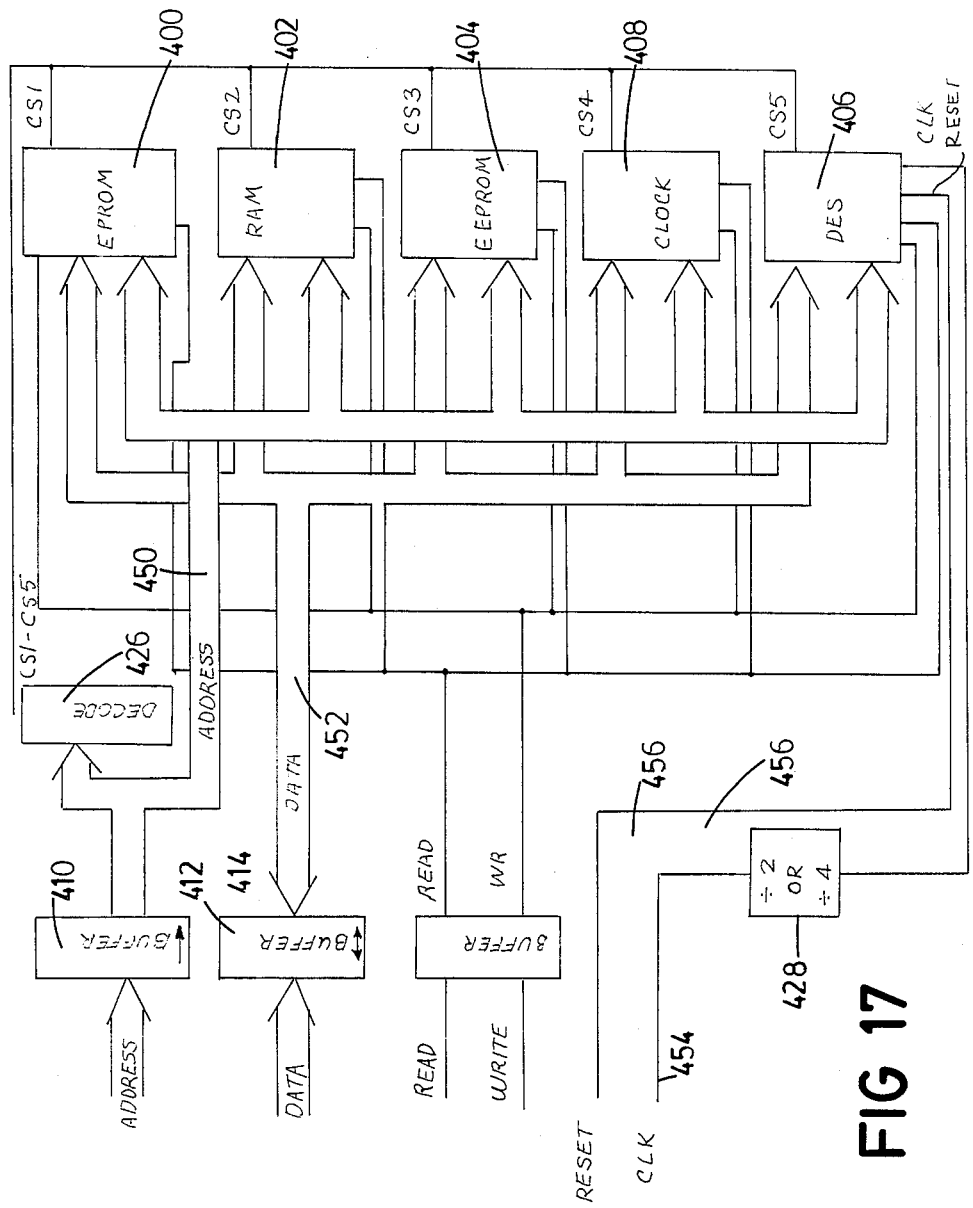
FIG. 17 is a signal flow diagram of the circuit board of FIG. 16.

The system of the present invention, as mentioned previously, is a combination of hardware and software. The hardware portion of the present invention is shown in FIGS. 16 and 17, and is made up of an expansion card for insertion into one of the expansion slots of the personal computer. FIG. 16 is a schematic of the component parts of the expansion card of the present invention, while FIG. 17 is a signal flow diagram. There are five main chips on the card of the present invention: EPROM 400; RAM 402; EEPROM 404; DES encryption chip 406; and clock chip 408. The EPROM 400 includes all of the machine language of the security system of the present invention for the 21H interrupt, for the 7CH interrupt, for boot handling for "kicking in" the system of the present invention, and the 13H interrupt for the formatting of hard disc. Thus, the EPROM is divided into four separate sections, each containing therein the appropriate machine language code for handling the interrupts, all of which have been described above when discussing the 21H interrupt, 7CH interrupt, and the 13H interrupt. The boot process handler portion of the EPROM chip shall be described below in greater detail when discussing the initialization of the security system of the present invention with DOS. The five chips are all coupled together in parallel in the usual manner, as shown in FIG. 16. Transceiver 410, coupled to each chip, is a data buffer connected to the PC interface I/O channel bus, while octal tristate buffers 412 and 414 also coupled to the five chips, are address buffers for the PC interface I/O channel bus. Clock crystal 416 coupled to the clock chip 408 via a 200 Ohm resistor 418 is provided for logging purposes. This is a standard crystal, with 32.768 kHz frequency. The clock chip may be that manufactured by the National Semiconductor Co., part number MM58167AN. This clock chip with its clock crystal 416 and battery provides the time and data information for all logging options chosen by the CSA, as set forth above. The EPROM 400 is manufactured by Intel Inc., number 2764. The volatile static RAM 402 may that manufactured by Motorola, Inc. number 6116. The EEPROM 404 may be that manufactured by XICOR Inc., number 2816 or 2804. The memory reserved by the ROM and RAM of the expansion card of the invention is 32K, in the preferred embodiment. The expansion card of the present invention also includes four small rocker switches or four-position dip switch 422 which is used to initially set the memory area of the system of the present invention for the RAM and ROM thereof. In the preferred embodiment, when there is no conflict with other expansion boards in use on the PC, these switches will set the memory area for "Sentinel" at location E0000 hex, location D8000 hex, or E8000 hex. There are sixteen possible choices of 32K memory areas from which to choose (address 80000 to F8000), some of which are used by various other expansion boards and ROM's. The three memory areas above-enumerated are those that are not usually used. The dip switch 422 is coupled to a 4-bit comparator 424 for enabling the board, which is coupled to the PC I/O channel bus by lines A13 through A16 thereof of the IBM PC 62-pin I/O channel bus. Address de-coder or de-multiplexer 426(LS139) is provided in the conventional manner. Flip-flop 428 (LS74) is also provided and connected to the "clock" line, in the usual manner, for dividing the system clock pulses down to a usable frequency for the DES chip 406. The DES chip 406 is one that is made by the Western Digital Corp., number WD2001. It includes the standard DES (Data Encryption Standard) code.

FIG. 17 shows the signal flow of events. Address buffer 410, connected to the five chips alobg address bus 450, is also connected through the decoder 426. Data bus 412, 414 is connected to the chips via data bus 452. Flip-flop 428 is coupled to the system clock via line 454 and to the DES chip, while the reset therefor is via line 456.

Figure 18:
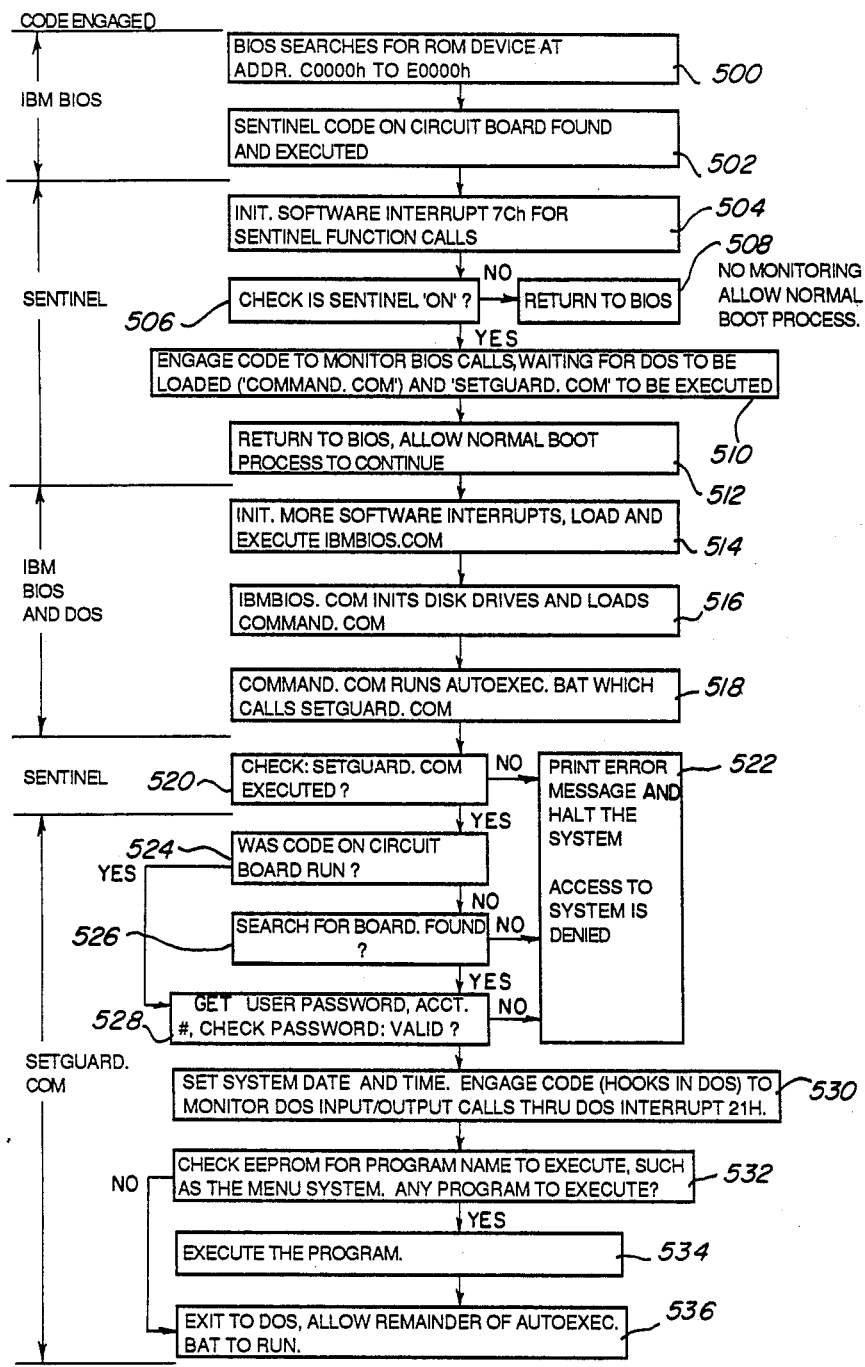
FIG. 18 is a flow chart showing the decision making processes of the security system of the present invention during boot processing, where the hardware and software components of the present invention combine to provide an unbeatable protection system.

To install the "Sentinel" security system of the present invention, a diskette is provided that includes the following files:
AUTOEXEC.BAT
SENTINEL.BAT
SETGUARD.EXE
INSTALL.EXE
FMTON.EXE
FMTOFF.EXT
DESINS.EXT The AUTOEXEC.BAT is a batch file for bringing up the system in the way desired, so that the security system of the present invention is initialized and "hooked" into the system, so that the use of the P.C. is not possible without first going through the system of the present invention. This batch file has as its first line the command: SETGUARD, which is the software security portion of the present invention, which, therefore, executes the SETGUARD program to automatically initialize the security system of the present invention. FIG. 18 is a flow diagram showing the logical steps followed in booting up the PC with Sentinel installed. Block 500 indicates that during the initial booting process, BIOS (Basic Input/Output System) searches for ROM from addresses C0000h to E0000h, in the usual manner (assuming the IBM PC does not have the BIOS ROM, prevalent in versions before March, 1983) and finds the code on the EPROM 400 of the "Sentinel" expansion card, and executes the code (block 502). The code on the EPROM will initiate the software interrupt 7Ch for the "Sentinel" function calls utilizing this interrupt (block 504). "Sentinel" then further checks to see if it is on or not, and if it is not, return to BIOS ensues (blocks 506 and 508). The CSA has the choice of the turning security system off under the OPTIONS program described above, which program is available only to the CSA, so that when certain IBM programs are run that tend to conflict with "Sentinel", such conflict would be avoided. If the security system is "on", then code is engaged to monitor BIOS calls, using BIOS interrupt 10H (the video handler interrupt), thus preventing access to DOS before the monitoring thereof by the security system of the present invention. Such BIOS 10H interrupt monitoring effectively prevents circumventing the securiy system of the invention by denying access. If such monitoring did not exist, then in the time it takes to execute the SETGUARD program a user may be able to gain access to DOS by another route (block 510). Blocks 512, 514, and 516 indicate the normal flow of events during the BIOS/DOS boot process handling, followed by the running of AUTOEXEC.BAT, which calls SETGUARD.COM (Block 18). Block 520 indicates that BIOS interrupt 10H checks to see that SETGUARD.COM has, in fact, been called and executed, and, if it has not been, then an error message is printed out(block 522). If the SETGUARD.COM has been executed, it checks to see if the code on the EPROM 400 on the circuit board has been run(block 514). If it has not (as, for example. when using the old BIOS ROM) it checks to see if the board is present (block 526). If the board is not present, then access is denied and an error message printed out, since an illegal attempt to access has been performed. If the code on the EPROM has been executed - for the "new" ROMS- then SETGUARD.COM carries out its steps, as indicated in blocks 528, which asks for user password, and checks to see if it is valid or not. Thereafter, the system date and time is set, and the code on the EPROM 400 for monitoring DOS interrupt 21H is engaged (block 530). Blocks 532 and 534 show whether or not there is a program to run or not. Block 536 indicates exit to DOS, with the remainder of AUTOEXEC.BAT allowed to run.

For the CSA to install the "Sentinel" security system of the invention, the INSTALL program on the installation disc is run, which completely resets the information contained on the EEPROM, erasing the passwords, resource allocation table information, and logging information thereon. Thus, "Sentinel" is prepared to start from the beginning, for the recording the information set by the CSA for his own needs. The installation disc also includes the password program, so that AUTOEXEC. BAT will automatically run the PASSWORD program after installation. The CSA must then enter his code, such as 22 (when there are only 20 normal user, and one CSA, and one local administrator). Thereafter, the CSA will put in his password, so that slot 22 will thereafter be associated with the password entered in that slot, thus denying access to that slot, and its associated controls, unless the correct password has been entered. Thereafter, the installation disc will automatically run the CSCTIME program, described previously, for setting the time and date. The DESINST-.EXT is then run, if the DES option has been chosen, for setting that encryption code. If another encryption code has been selected, then the CSA simply ignores this program, and presses the necessary keys to end the batch file. This installation diskette is used only at the time of installation; during normal usage of the PC with "Sentinel" installed, the simple boot diskette is used, which includes the AUTOEXEC.BAT file, with the SETGUARD.EXE. program thereon, along with the other various programs described previously. For normal users, another diskette is prepared, in which is included the programs to which they have access.

While a specific embodiment of the invention has been shown and described, it is to be understood that numerous changes and modifications may be made therein without departing from the scope and spirit of the invention, as set out in the appended claims. For example, with owners of personal computers utilizing fixed disc storage, most or all of the files on the diskette of the invention which includes all of the programs for controlling the security of the P.C. may be stored on the fixed disc, including the AUTO.EXEC and SETGUARD programs.

What is claimed is:

1. A security system for protecting an IBM personal computer, or IBM-compatible personal comptuer, against unwanted access to the files thereof and unwanted access to the operating system thereof, comprising:

an expansion card for insertion into an expansion slot of the personal computer;

said expansion card comprising at least one memory means for storing machine code having a first portion for monitoring file interrupt function calls to the files of the personal computer;

first means for storing information thereon directed to the access rights of users of the personal computer and access rights to the files of the personal computer;

said at least one memory means having a second portion thereof for monitoring all video handler interrupt functions to ensure the security system cannot be overridden during boot processing; and a third portion for allowing communication between exterior processes and the disc operating system of the personal computer through an available interrupt call of the system;

and second means for storing said exterior processes for access to said disc operating system via said third portion, whereby access to files are protected by a user-by-user basis, and on a file-by-file basis.

2. The security system according to claim 1, wherein said at least one memory means is an EPROM, and comprises a fourth portion thereof for monitoring all disc Input/Ouput System interrupts of BIOS in order to prevent accidental or unlawful formatting of hard disc of the personal computer.

3. The security system according to claim 1, wherein said available interrupt used by said third portion of said at least one memory means is the 7Ch interrupt vector.

4. The security system according to claim 1, wherein said first means for storing comprises an EEPROM, and said second means for storing comprises at least a diskette; said second means for storing including a series of utility programs for communicating via said available interrupt.

5. The security system according to claim 1, wherein said first means for storing comprises password codes for the users able to gain access to the personal computer, and information as to the files that are accessible by each individual user.

6. The security system according to claim 5, wherein said information as to the files that are accessible by each individual user comprises a first code allowing only read access to a respective file or files on a user basis, a second code allowing both read and write access to a respective file or files on a user basis, and a third code for denying both read and write access to a respective file or files on a user basis.

7. The security system according to claim 6, wherein said information as to the files that are accessible further comprises a fourth code for denying access to a respective department of files on a user basis, a fifth code for allowing only read access to a respective department of files, and a sixth code for allowing both read and write access to a respective department of files.

8. The security system according to claim 1, wherein said expansion card further comprises an encryption chip for encrypting a chosen file, said second means for storing comprising means for initiating said encryption chip; said first means for storing comprising an EEPROM having a first code thereof defining the encryption state of a respective file, a second code for allowing only read access to a respective file on a user basis, a third code for allowing read and write access to a respective file on a user basis, and a fourth code for denying total access to a respective file; said EEPROM further comprising code for the passwords of valid users of the personal computer; said second means for storing comprising means for changing each of said first, second, third, and fourth codes and said passwords codes via said available interrupt.

9. the security system according to claim 8, wherein said second means for storing further comprises means for automatically installing said expansion card with the disc operating system of the personal computer, said means for automatically installing comprising a batch file, and means for engaging the code of said first portion of said at least one memory means to monitor DOS input/output calls through the DOS file handling interrupt.

10. The security system according to claim 1, wherein said expansion card further comprises a clock chip and associated crystal for recording the date and time of all accesses to a respective file and for recording the date and time of user password inputs, so that an audit trail may be kept of all illegal and legal accesses to DOS and files thereof; said first means for storing further comprising a section for recording thereon the date and time log of the audit trail provided by said clock chip; said second means for storing comprising means for initiating said clock chip and storing said audit trail on said EEPROM.

11. The security system according to claim 10, wherein said second means for storing further comprises means for dumping the log of said audit trail from said EEPROM to a disc file, when said section for recording of said EEPROM becomes full.

12. A security system for protecting an IBM personal computer, or IBM-compatible personal computer, comprising:
an expansion board having a first memory;
said first memory comprising machine code for hooking up the operating system of the personal computer with the security system, said first memory having a first main interrupt handler section for monitoring 21H DOS function calls, a second interrupt handler section for allowing communication between exterior processes through an available function interrupt vector; and a third section for boot process handling for initializing said first main interrupt handler section and said second interrupt handler section;
means for inputting and verifying the passwords of each user of the personal computer, said third section of said first memory chip causing said means for inputting and verifying to be executed during boot processing;
second memory mounted by said expansion board having a first portion for storing thereon the codes for said passwords, a second portion for storing thereon codes determinant of the access right each user has to a respective file, and the state of encryption of a respective file;
said second memory having a third portion for storing thereon an audit trail showing the date and time of accesses to the DOS and its files;
a clock chip and associated crystal mounted on said expansion board for providing the time and date of all logon attempts and all attempted accesses to the files;
means for recording the time and date audit trail from said clock chip onto said third portion of said second memory for every DOS and file access attempt; and
means for continually inputting information onto said first and second portions of said second memory, so that the status of each user and the state of each file may be altered; said means for continually inputting information comprising means for preventing the use thereof by unauthorized person.

13. The security system according to claim 12, wherein said expansion board further comprises switch means for setting the memory addresses of the memory locations on said expansion board, and a comparator coupled to said switch means for enabling said expansion board.

14. The security system according to claim 12, wherein expansion board further comprises an automatic encryption chip coupled to the system time clock, and a flip-flop coupling said encryption chip to the system time clock for dividing down the clock pulses to a usable frequency, said encryption chip automatically encrypting a respective file so chosen; and means for initializing said encryption chip so that all encryption of desired files will take place.

15. The security system according to claim 14, further comprising means for selectively choosing constant encryption of all protected files of DOS, and selectively choosing encryption of only selected files thereof on a user-by-user basis, said means for selectively choosing storing in said second portion of said second memory the relevant code thereof indicative of the state of encryption of a respective file.

16. The security system according to claim 15, wherein said expansion board further comprises a volatile ram chip for expanding the system memory available.

17. The security system according to claim 15, further comprising means for selecting between a plurality of encryption methods for encrypting a respective file, so that files may be encrypted in that encryption method desired, and so that the transmission of sensitive data may be accomplished without the correct decryption thereof at the receiving end.

18. The security system according to claim 12, wherein said second portion of said second memory further comprises a flag for preventing the copying of a respective file by any user of the personal computer.

19. A security system for guarding against unwanted user-access to a personal computer and access to the files thereof, comprising:
an expansion board for insertion into an expansion slot of the personal computer;
said expansion board comprising a read-only-memory having machine code thereon for initializing the security system with the operating system of the personal computer;
at least one of a nonvolatile ram chip and EEPROM chip for erasably storing thereon code indicative of the status of each user's access rights to a respective file of the system of the personal computer, code indicative of the passwords for valid users of the system of the personal computer, and code indicative of the audit trail of at least one of selected accesses to the system of the personal computer and selected accesses to the files of the system;
a clock chip and associated crystal on said expansion board for logging the time and date of selected accesses to at least one of the operating system and selected files;
means for recording the audit trail log code on said at least one of said nonvolatile ram and EEPROM for subsequent insepction thereof by a supervisor;
means for initializing said clock chip with the operating system of the personal computer;
means for erasably encoding said at least one of a nonvolatile ram and EEPROM for recording thereon desired information regarding the state and stats of system flags; and means for accessing the information stored on said at least one nonvolatile ram and EEPROM for the reading thereof by a supervisor.

20. The security system for as personal computer according to claim 19, further comprising an automatic encryption chip mounted on said expansion board for encrypting selected files, said expansion board comprising means coupling said encryption chip to the computer system clock; and means for selectively choosing the state of encryption of the files of the computer system, said means for selectively choosing storing flags indicative of the state of the encryption of the respective files on said at least one nonvolatile ram and EEPROM.

21. The security system according to claim 20, wherein said read-only-memory comprises code for monitoring all file handling interrupt function calls, the code on said at least nonvolatile ram and EEPROM thereafter determining the allowance or disallowance of the respective function call; said read-only-memory further comprising code for establishing communication between exterior processes and the at least one of nonvolatile ram and EEPROM through an available interrupt vector for changing system flags.

22. The security system according to claim 21, wherein said expansion board coprises switch means for setting the addresses of the memory chips on said expansion board, and means coupling said switch means to the channel bus interface of the computer for enabling said expansion board.

23. A method of protecting access to a personal computer and the files thereof, comprising:
inputting a code indiciative of the user seeking access to at least one file of the personal computer;
monitoring the file handling interrupt function calls of the operating system of the personal computer;
determining the status of the user with respect to the at least one file the access to which is sought by the user, said step of determining comprising determining if the user seeking access has read-only access to the at least one file, and read and write access to the at least one file;
peritting access to the at least one file if the user has access rights thereof congruent with the file handling interrupt function call initiated;
denying access to the at least one file if the user does not have access rights thereof that are not congruent with the file handling interrupt function call initiated;
initiating an available interrupt vector of the operating system of the personal computer by which to alter the status of each user with respective to each file when so desired and for determining the current states of the users and files and the status flags thereof for each user and file; and
monitoring all video handler interrupt function calls during the booting up process so that said step of monitoring the file handling interrupt function calls may be carried out and not circumvented.

24. The method according to claim 23, wherein each of said steps of permitting access and denying access comprises inserting a plurality of system flags determinant of the status of each user with respect to each file; said step of inserting a plurality of system flags comprising initializing an available interrupt vector of the operating system of the personal computer, and inputting respective function calls therefor.

25. The method according to claim 24, further comprising validating user access-rights to the operating system of the personal computer during the booting up process.

26. The method according to claim 23, further comprising selectively encrypting newly-created files and currently-existing files so that they are not readable without the proper decryption thereof.

27. The method according to claim 26, wherein said step of selectively encrypting comprises having a central security administrator choose which files are to be encrypted; said step of having a central security administrator choose comprising inputting system flags determinant of the state of encryption of each file onto memory.

28. The method according to claim 23, further comprising monitoring hard disc formatting by monitoring the hard disc formatting interrupt handler of the personal computer, and denying the formatting thereof for invalid users.

29. The method according to claim 23, further comprising the step of preventing the copying of a selected file by an invalid user seeking such copying.

30. The method according to claim 23, further comprising keeping an audit trail of at least one of: all accesses to the operating system of the personal computer, and to at least some of the files thereof.

31. The method according to claim 27, wherein said step of selectively encrypting further comprises choosing a desired encryption method by which the selected files to-be-encrypted are encrypted.

32. A method of controlling access to the operating system of a personal computer and to the files thereof, comprising:
inserting an expansion board into an expansion slot of the personal computer;
initializing the components chips of the circuit board with respect to the operating system of the personal computer;
grouping the files of the personal computer according to files to-be-protected and files not-to-be protected;
further dividing the files to-be-protected according to file groups with each file-group having at least one file thereof, and according to departments with each department having at least one file-group thereof;
appointing access-rights to each of the file groups and departments of file-groups by individual user having access to the operating system of the personal computer, said step of appointing comprising assigning read access-rights only to a respective user and read and write access-rights to a respective user by file-group and by department;
said step of dividing the files into file-groups and departments comprising a first step of inputting onto an erasable non-volatile memory on the expansion board object code indicative of the grouping thereof;
said step of appointing access-rights comprising a second step of inputting onto an erasable non-volatile memory object code indicative of the status of each user with respect to each file-group and department;
electing which of the to-be-protected files and not-to-be protected files are to be encrypted;
choosing a desired encryption method for files to-be-encrypted; and encrypting files to-be-encrypted with the desired encryption method from said step of choosing a desired encryption method for files to-be-encrypted, said step of encrypting comprising inputting object code from a encryption chip on said expansion board to the erasable nonvolatile memory on the expansion board.

33. The method according to claim 32, further comprising logging all access attempts to the operating system of the personal computer and access attempts to all protected files; said step of logging comprising inputting object code onto the erasable nonvolatile memory from a clock chip on the expansion board.

* * * * *

UNITED STATES PATENT AND TRADEMARK OFFICE
CERTIFICATE OF CORRECTION

PATENT NO. : 4,757,533

DATED : July 12, 1988

INVENTOR(S) : Michael J. Allen; John Langlois

It is certified that error appears in the above-identified patent and that said Letters Patent is hereby corrected as shown below:

Column 2, line 52, "; of each file group with regard to encryption" should be deleted;

Column 8, line 47, "entires" should be --entries--;

Column 9, line 12, "him" should be deleted;

Column 9, line 54, insert "or the user" after "CSA";

Column 9, line 66, "it is an" should be deleted;

Column 11, line 31, "CSS" should be --CSA--;

Column 12, line 54, "half" should be --halt--;

Column 22, line 38, "openign" should be --opening--;

Column 23, line 58, "DOs" should be --DOS--;

Column 25, line 68, "alobg" should be --along--;

Column 26, line 63, "514" should be --524--;

Column 27, line 17, delete "the" after "for".

Column 2, line 6, "functon" should be --function--;

Column 2, line 28, "syustem" should be --system--;

UNITED STATES PATENT AND TRADEMARK OFFICE
CERTIFICATE OF CORRECTION

PATENT NO. : 4,757,533

DATED : July 12, 1988

INVENTOR(S) : Michael J. Allen, John Langlois

It is certified that error appears in the above-identified patent and that said Letters Patent is hereby corrected as shown below:

Column 5, line 5, insert --

"A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoeve:

after "Detailed Description of the Invention";

Column 7, line 36, "accomplishesh" should be --accomplished--;

Column 8, line 30, "termined" should be --termed--;

Column 13, line 32, insert "Copyright 1984 Computer Security Corporation" after "III Sentinel Interrupt Handler."

Column 24, line 41, "3896" should be --386--;

Column 26, line 50 "securiy" should be --security--;

Column 27, line 53, "AUTO.EXEC" should be --AUTOEXEC--;

UNITED STATES PATENT AND TRADEMARK OFFICE
CERTIFICATE OF CORRECTION

PATENT NO. : 4,757,533
DATED : July 12, 1988
INVENTOR(S) : Michael J. Allan, John Langlois It is certified that error appears in the above-identified patent and that said Letters Patent is hereby corrected as shown below:

Column 30, line 68, "stats" should be --status--;

Column 31, line 4, "as" should be --a--;

Signed and Sealed this

Twenty-eighth Day of November 1989

*Attest:*

JEFFREY M. SAMUELS

*Attesting Officer*     *Acting Commissioner of Patents and Trademarks*